March 4, 1952　　　　J. M. LAIHO　　　　2,588,127
INTERLOCK FOR CALCULATING MACHINE CONTROL KEYS
Original Filed Aug. 8, 1942　　　　12 Sheets-Sheet 1

Inventor:
Jalmer M. Laiho
By:
Sheridan, Davis & Cargill
Attys.

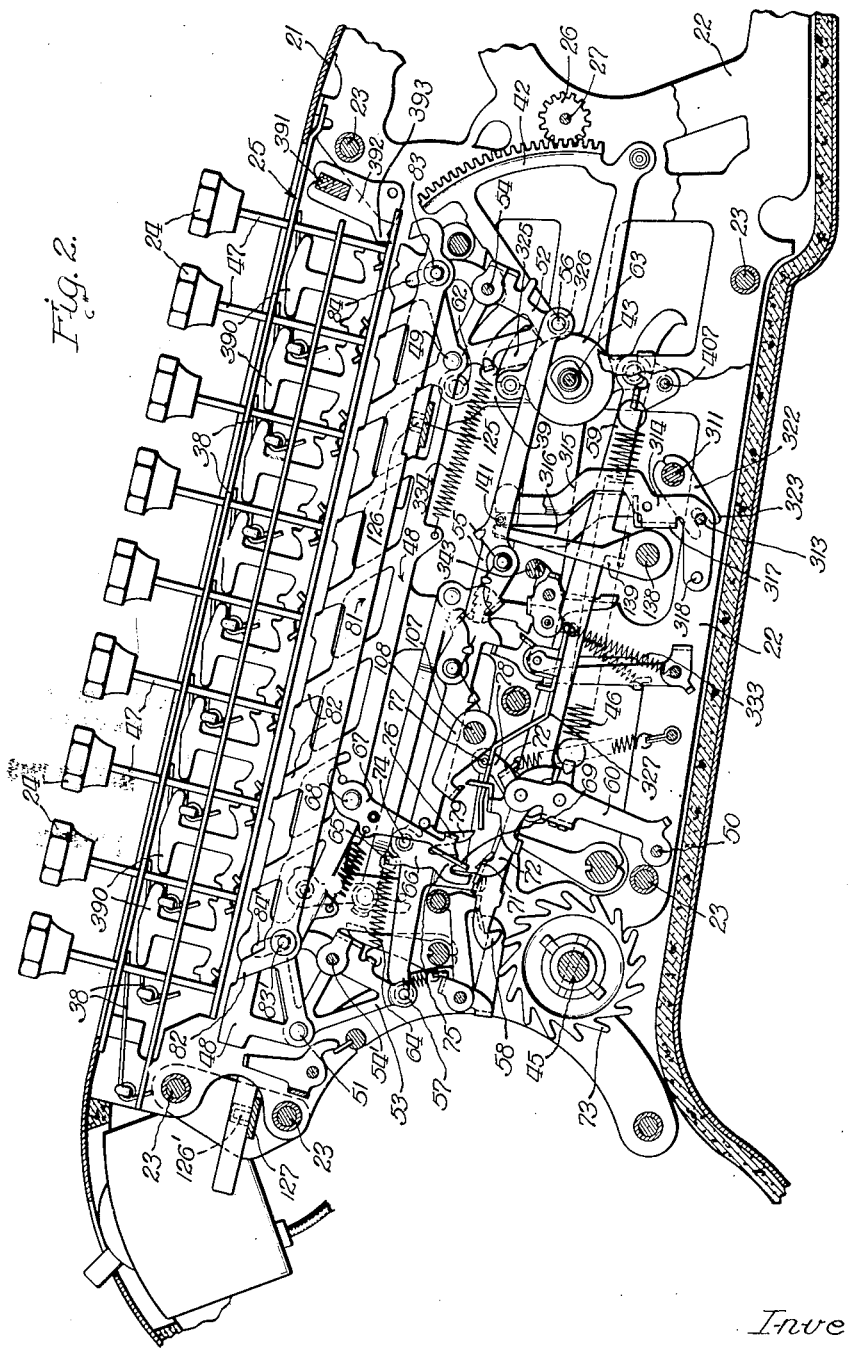

Fig. 3.

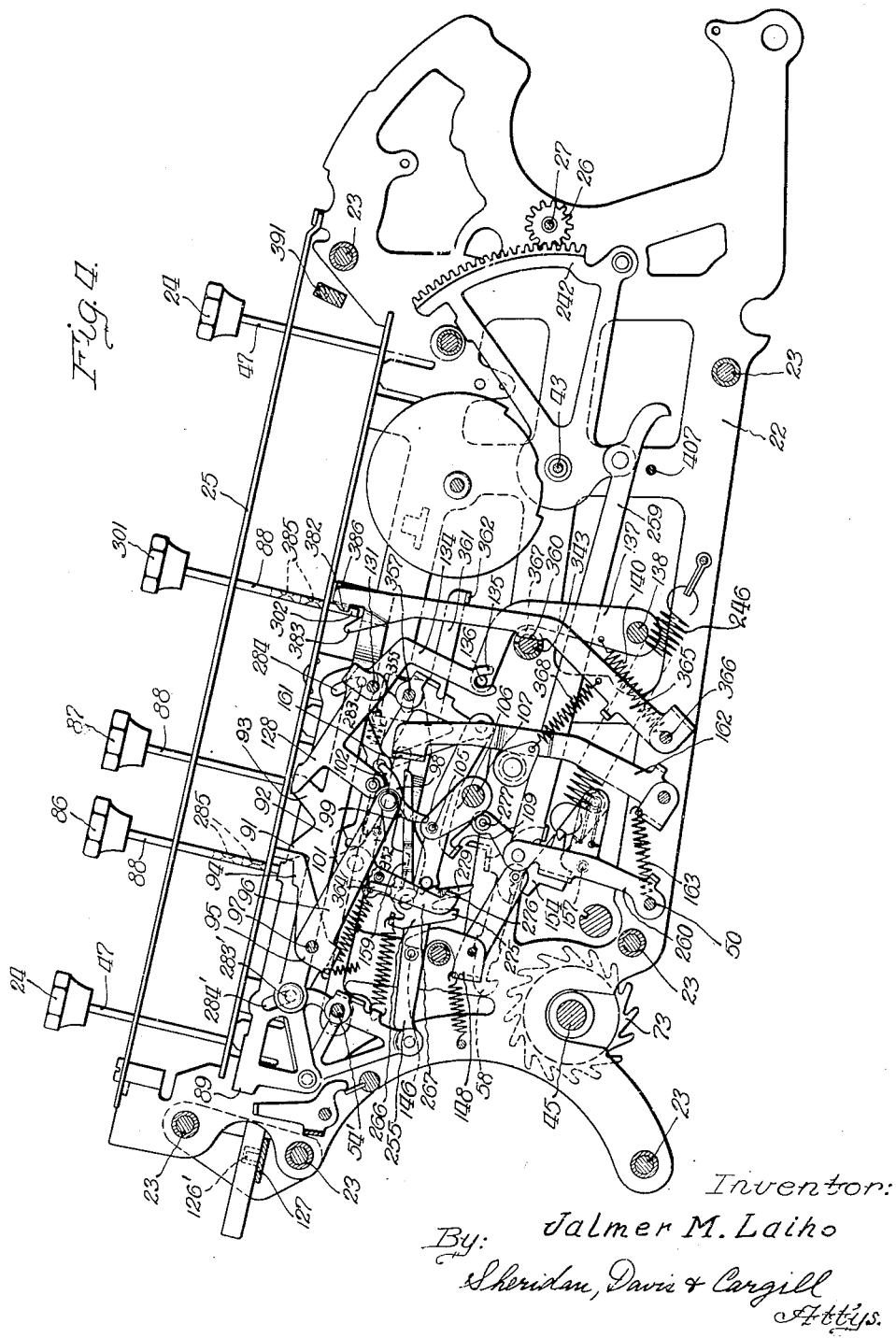

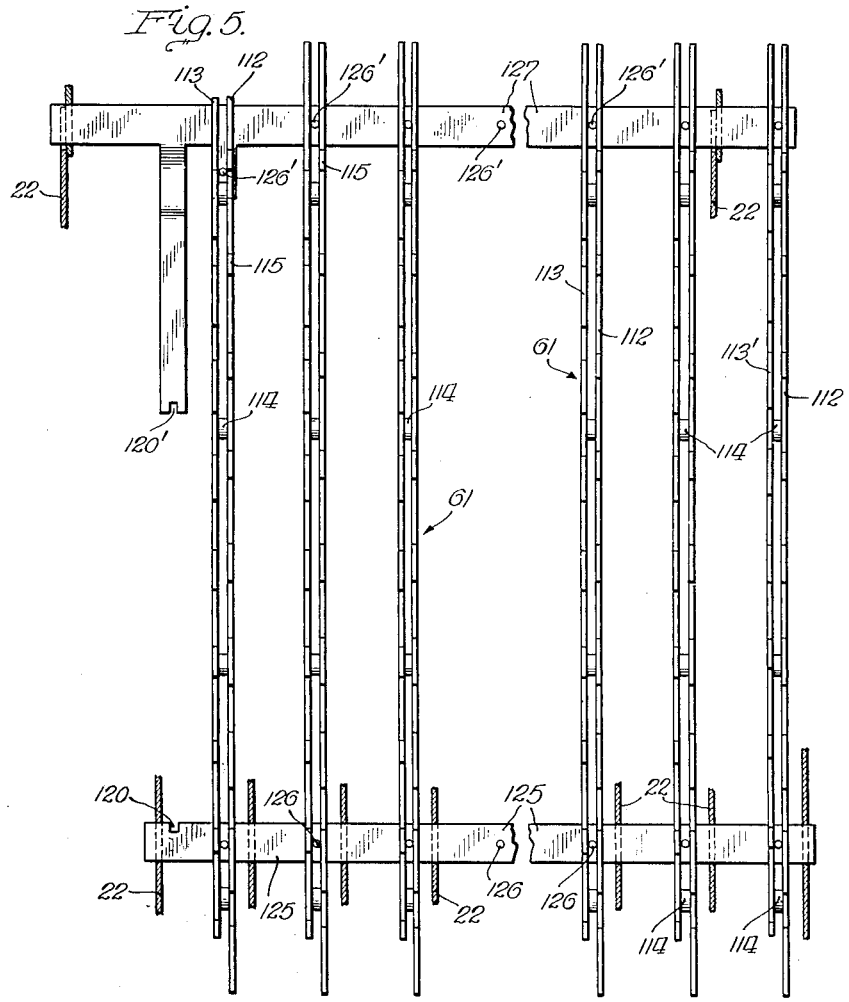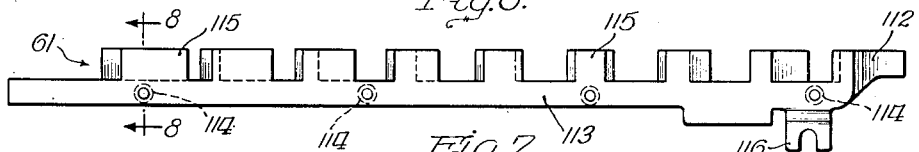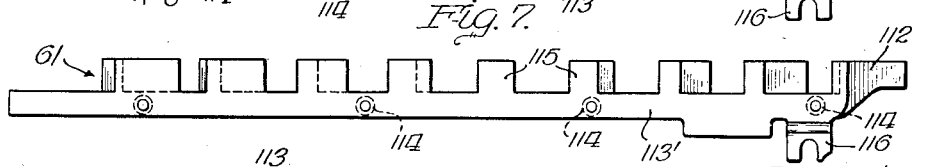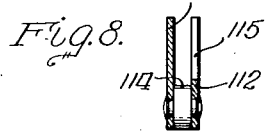
Inventor:
Jalmer M. Laiho

March 4, 1952  J. M. LAIHO  2,588,127
INTERLOCK FOR CALCULATING MACHINE CONTROL KEYS
Original Filed Aug. 8, 1942  12 Sheets-Sheet 6
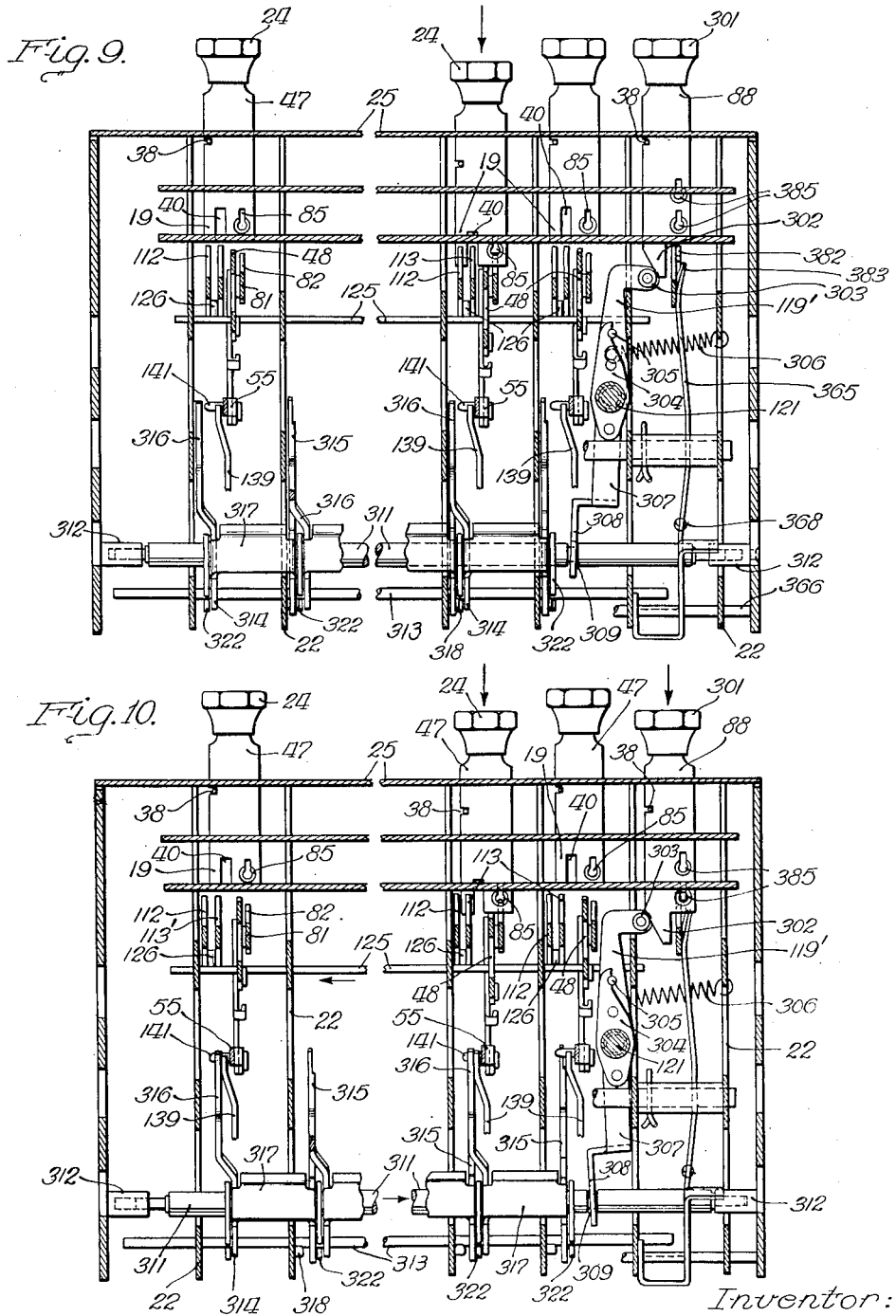
Inventor:
Jalmer M. Laiho
By: Sheridan, Davis & Cargill
Attys.

March 4, 1952  J. M. LAIHO  2,588,127
INTERLOCK FOR CALCULATING MACHINE CONTROL KEYS
Original Filed Aug. 8, 1942  12 Sheets-Sheet 8
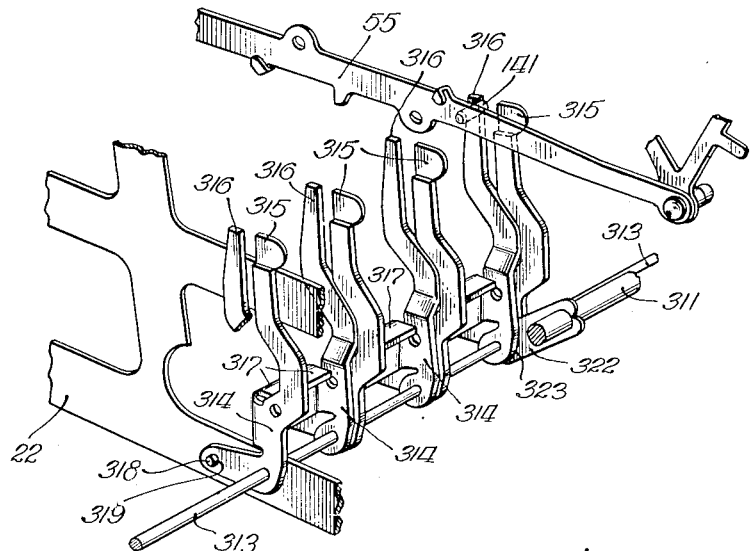
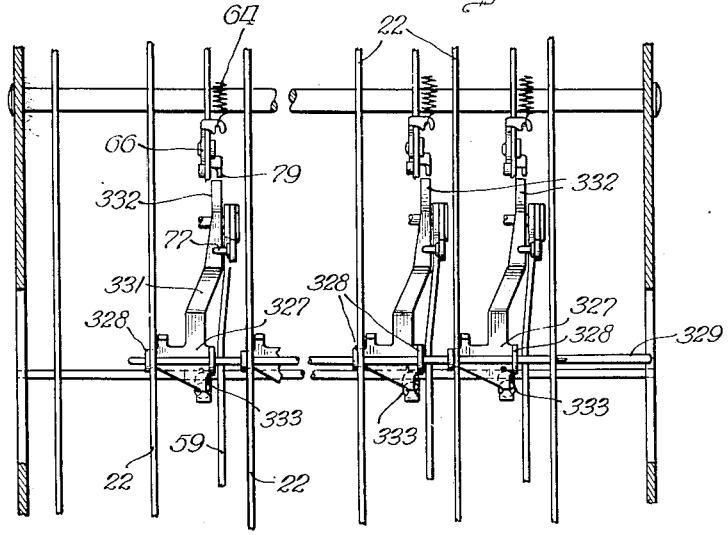
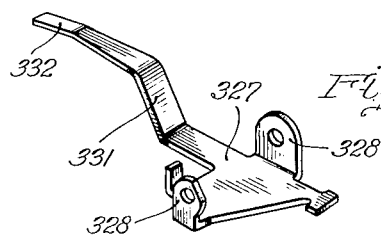
INVENTOR:
Jalmer M. Laiho
BY:
Sheridan, Davis & Cargill
ATTORNEYS.

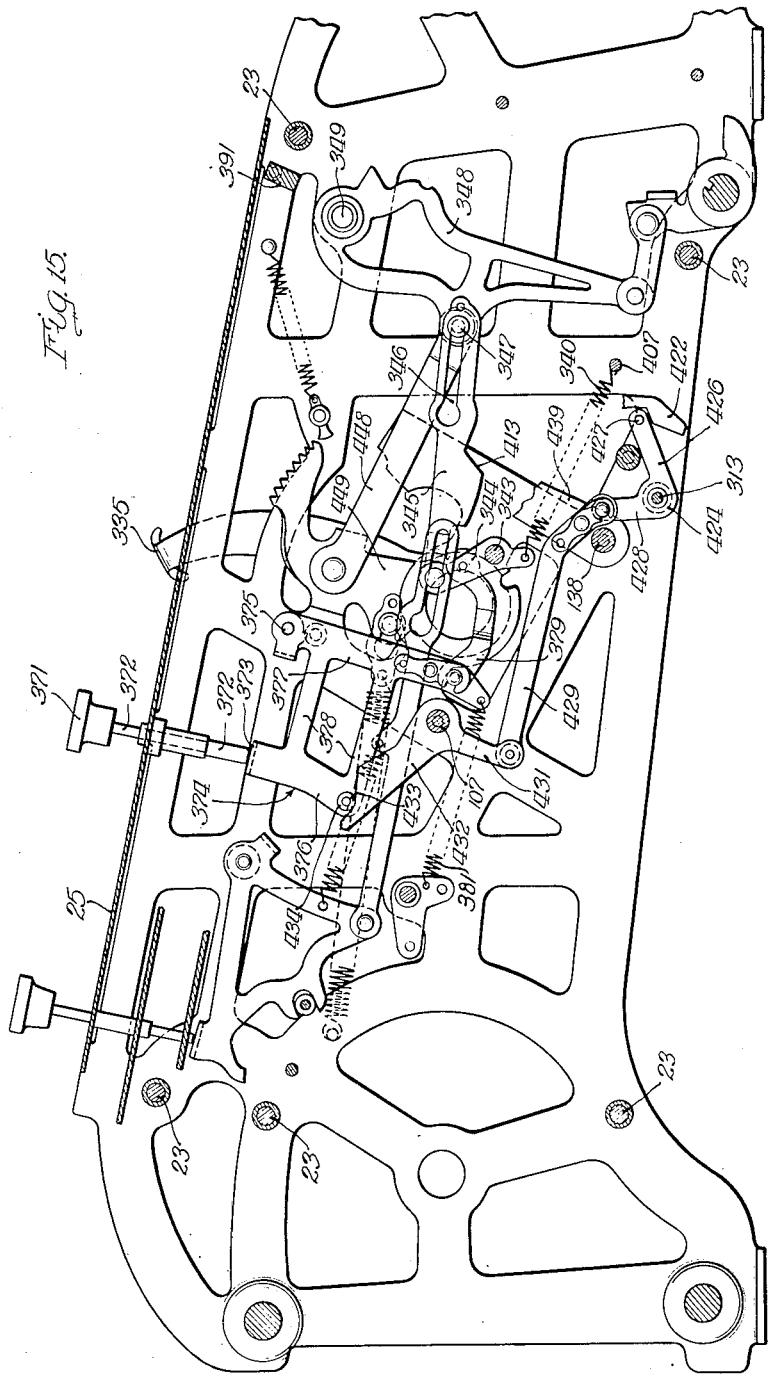

March 4, 1952         J. M. LAIHO         2,588,127
INTERLOCK FOR CALCULATING MACHINE CONTROL KEYS
Original Filed Aug. 8, 1942                  12 Sheets-Sheet 10
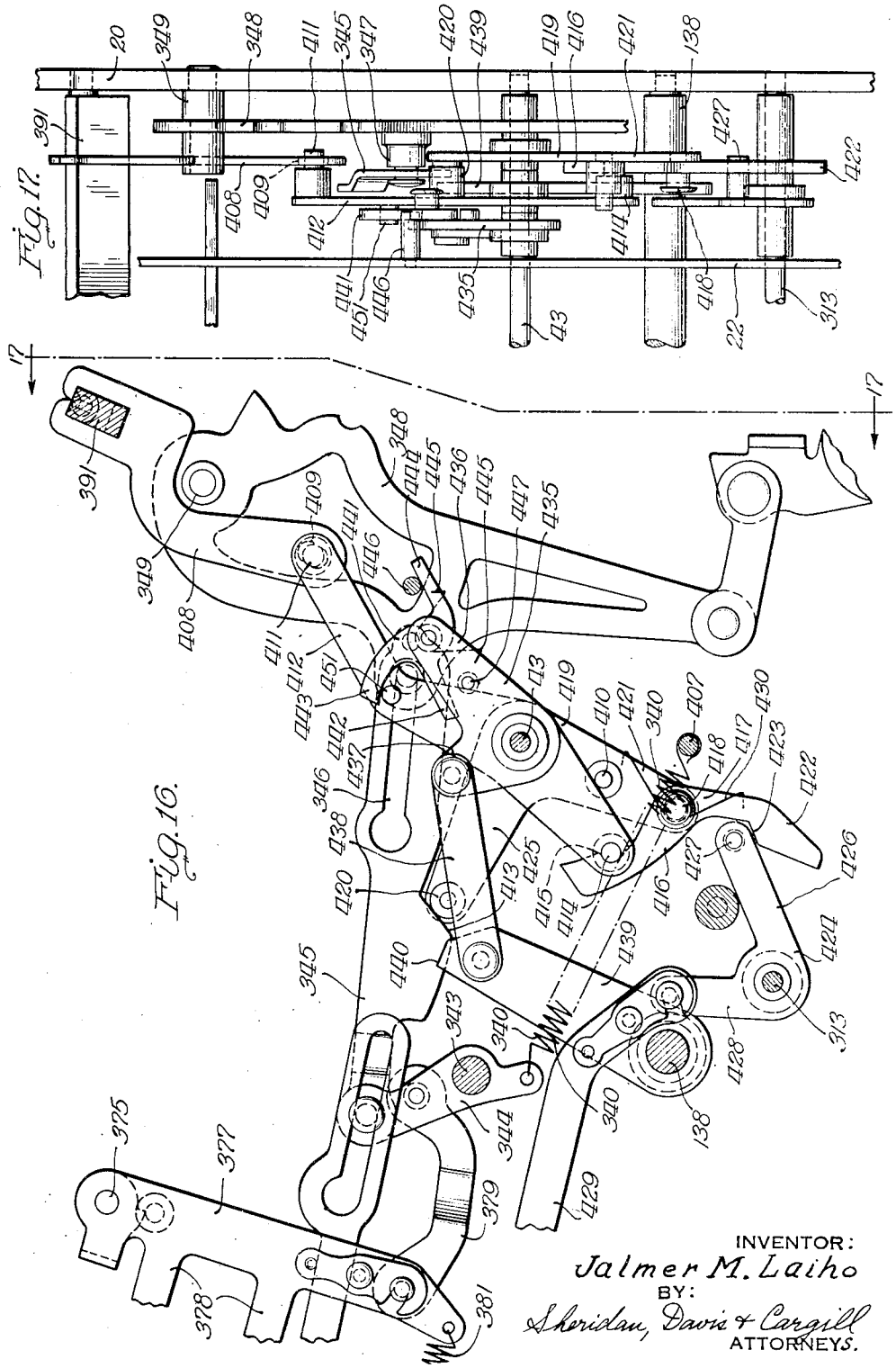
INVENTOR:
Jalmer M. Laiho
BY:
Sheridan, Davis & Cargill
ATTORNEYS.

March 4, 1952 J. M. LAIHO 2,588,127
INTERLOCK FOR CALCULATING MACHINE CONTROL KEYS
Original Filed Aug. 8, 1942 12 Sheets-Sheet 11
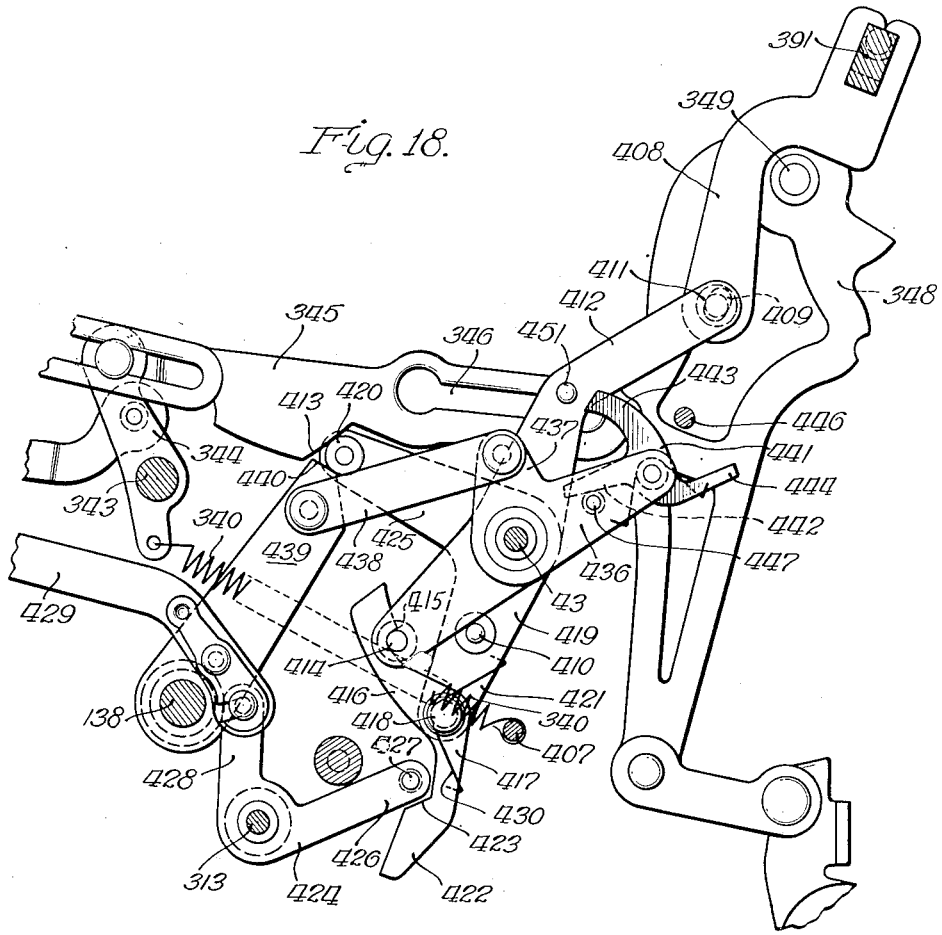
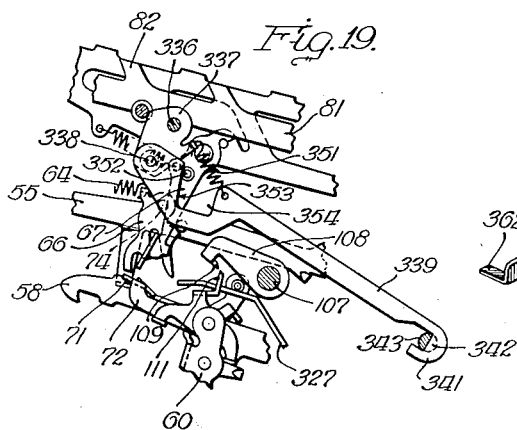
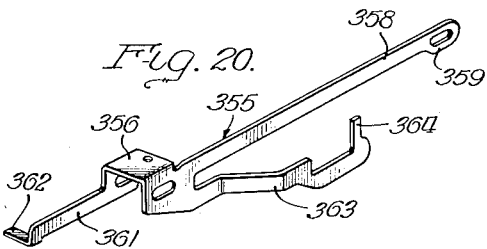
INVENTOR:
Jalmer M. Laiho
BY:
Sheridan, Davis & Cargill
ATTORNEYS.

March 4, 1952     J. M. LAIHO     2,588,127
INTERLOCK FOR CALCULATING MACHINE CONTROL KEYS
Original Filed Aug. 8, 1942     12 Sheets-Sheet 12
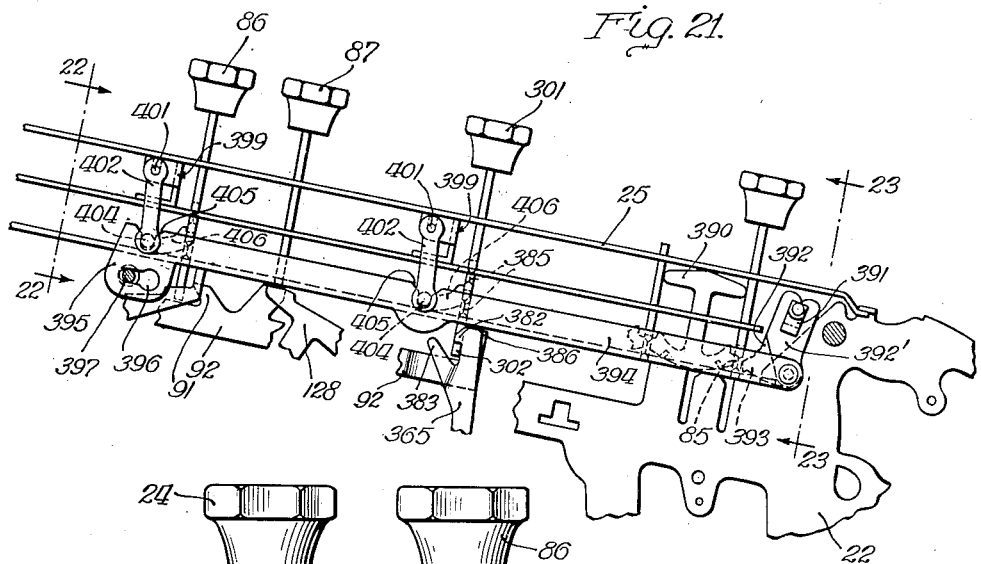
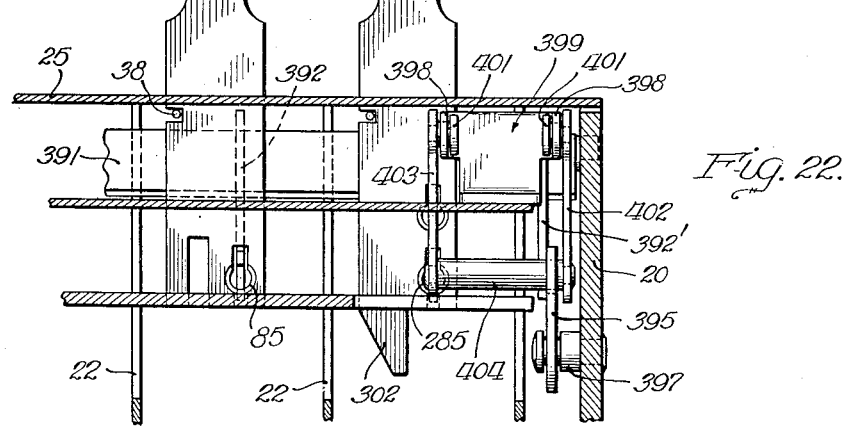
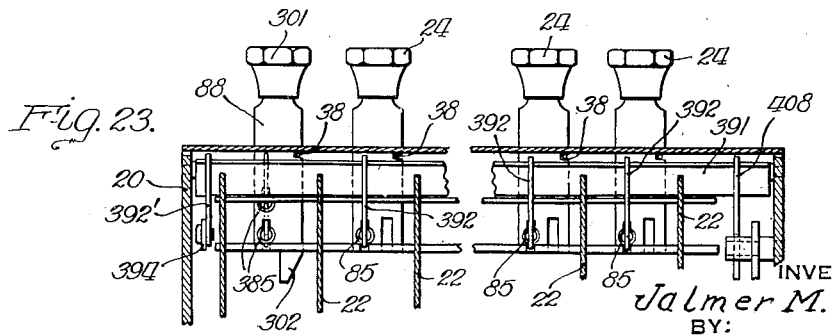
INVENTOR:
Jalmer M. Laiho
BY:
Sheridan, Davis & Cargill
ATTORNEYS.

Patented Mar. 4, 1952

2,588,127

UNITED STATES PATENT OFFICE 2,588,127

INTERLOCK FOR CALCULATING MACHINE
CONTROL KEYS

Jalmer M. Laiho, Skokie, Ill., assignor to Felt &
Tarrant Manufacturing Company, Chicago, Ill.,
a corporation of Illinois Original application August 8, 1942, Serial No.
454,111, now Patent No. 2,492,703, dated December 27, 1949. Divided and this application
May 14, 1949, Serial No. 93,393

11 Claims. (Cl. 235—130)

This invention relates in general to calculating machines and has more particular reference to the provision of means for facilitating the use of power-driven, key-responsive machines in negative forms of calculation; namely, subtraction and division, and this application is a division of my co-pending application Serial No. 454,111, filed August 8, 1942, and issued December 27, 1949, as United States Patent No. 2,492,703.

A principal object of the invention is to simplify division operations in and with key-responsive calculating machines.

Another important object of the invention is the provision of control means operable to cause the complemental values of a divisor to be automatically entered into the accumulator in division operations.

A further object of the invention is the provision of means in a key-responsive calculating machine for releasing keys depressed in entering the subtrahend which have been retained in depressed position preparatory to a subtractive operation.

An important object of the invention is the provision of a novel means for preventing the simultaneous depression of a digital control key and a calculation control key.

Another object of the invention is the provision of means in a key-driven or key-responsive calculating machine for preventing the simultaneous depression of a digital control key and the release key and/or operation of the zeroizing levers.

A further object of the invention is the provision of novel means for preventing simultaneous depression of any two calculation control keys.

Numerous other objects and advantages of the invention will be apparent as it is better understood from the following description, which, when taken in connection with the accompanying drawings, discloses a preferred embodiment thereof.

In the accompanying drawings:

Figure 2 is a longitudinal vertical section taken through the calculating machine shown in Fig. 1 on a plane adjacent a column of digital keys;

Figure 3 is a longitudinal vertical section taken through the calculating machine of Fig. 1, on a plane adjacent the overflow column and showing the digital control shifting mechanism and details of the accumulator mechanism;

Figure 4 is a longitudinal vertical section also taken at the left side of the calculating machine shown in Fig.1, and showing the subtraction and division control mechanism;

Figures 5, 6 and 7 are detail views of the digital actuation control mechanism;

Figure 8 is a detail view showing the construction of the digital control bar, taken along the line 8—8 of Fig. 6;

Figure 9 is a transverse section taken at the rear of the machine and looking toward the front thereof, with certain parts omitted to show details of the division control mechanism when the machine is set for additive actuation;

Figure 10 is a similar view showing the division control mechanism when the machine is set for divisive operation;

Figure 12 is a perspective view of the overlapping means for causing automatic actuation of all denominational orders where no keys are depressed to the right of the key representing the leftmost or highest order figure of the divisor which is depressed in entering the divisor during a divisive operation;

Figure 13 is a top plan view of the latch means for preventing relatching of the power trip mechanism and digit control keys in depressed position after a power action has taken place;

Figure 14 is a perspective view of the said latch;

Figure 15 is a longitudinal vertical section of the calculating machine shown in Fig. 1 taken at the right side of the machine and showing the release keys and zeroizing crank;

Figure 16 is an enlarged view showing details of part of the interlocking mechanism;

Figure 17 is a front elevation of the mechanism shown in Fig. 16 taken on the line 17—17 of Fig. 16;

Figure 18 is an enlarged view showing some parts of the mechanism of Fig. 16 in changed position, and with parts broken away;

Fig. 19 is a view showing a supplemental key release mechanism;

Figure 20 is a perspective view of a modification of the supplemental key release mechanism employed in a single order of the machine in order to clear certain parts which obstruct and prevent the use of the key-release mechanism of Fig. 19 in that order;

Figure 21 is a side elevation of part of the interlocking mechanism associated with the control keys at the left hand side of the machine;

Figure 22 is a rear view of the mechanism shown in Fig. 21 taken on the line 22—22 of Fig. 21 and drawn at a different scale;

Figure 23 is a front view of the mechanism shown in Fig. 21 taken on the line 23—23 of Fig. 21.

Figure 3:
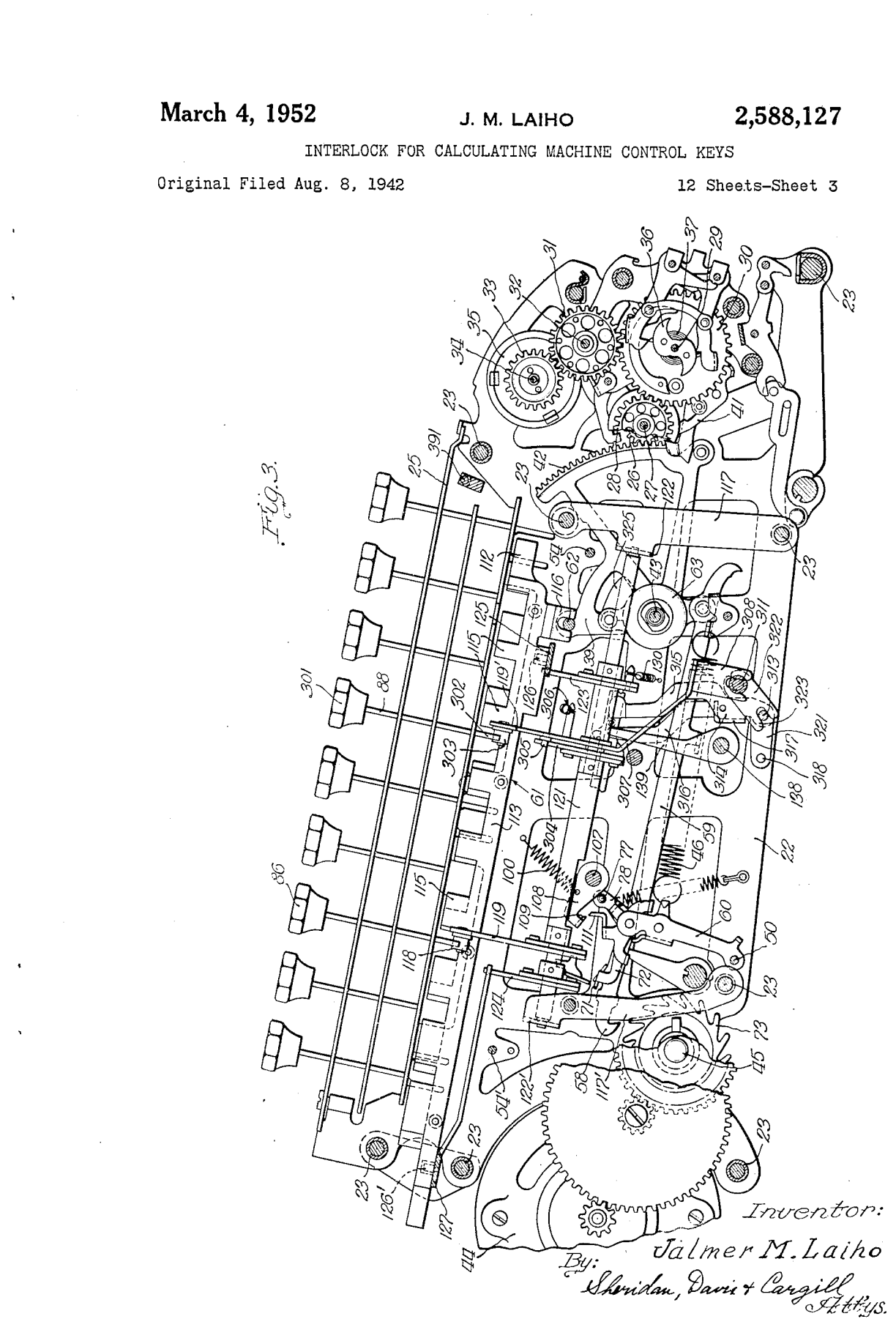
Figures 1, 1A:
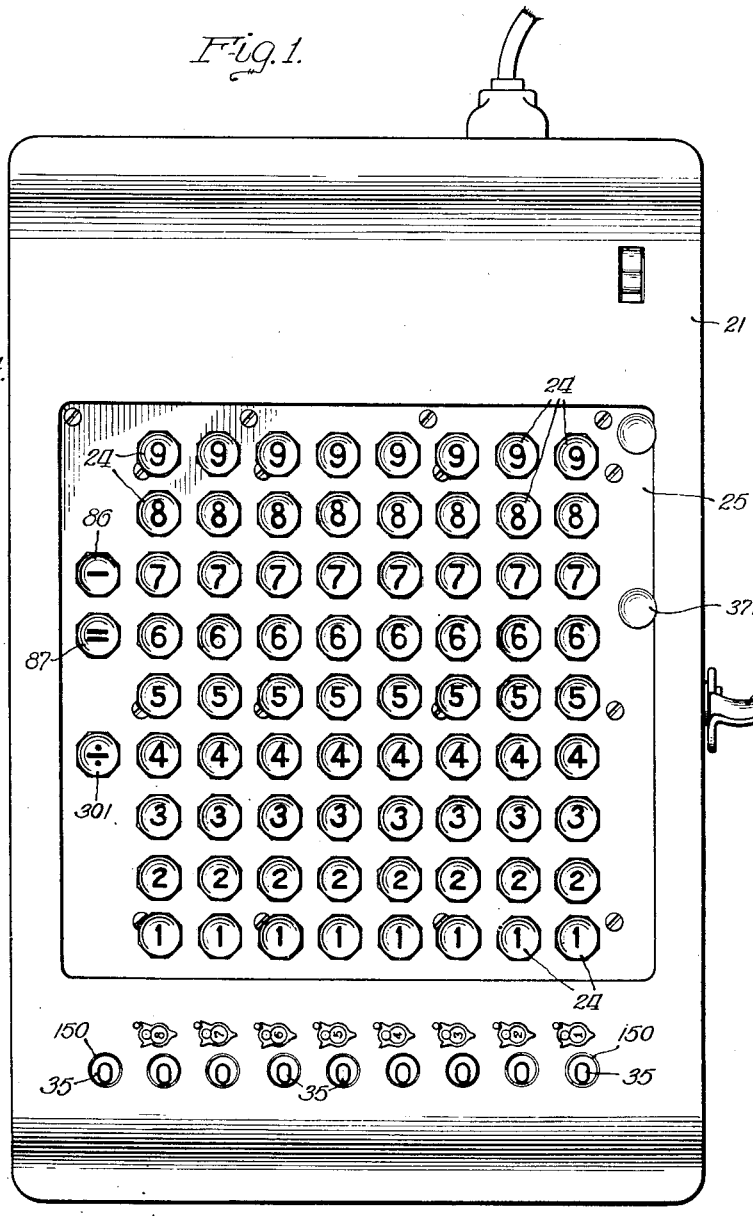
Figure 1 is a top plan view of a calculating machine embodying the invention, showing the "minus" and "equals" keys and the "division" key located to the left of the several denominational orders of digital keys.
Figure 1A is a top plan view of a single denominational order of keys complementally marked in accordance with the former method of performing negative calculating with key-driven or key-responsive calculating machines.

For the purpose of illustrating my invention, I have shown in the drawings a key-responsive, power-driven calculating machine similar to that shown and described in Patent No. 2,063,962, issued December 15, 1936, with some changes as shown in United States Letters Patent No. 2,018,933, issued October 29, 1935, and with improvements illustrated, described and claimed in my co-pending application, Serial No. 411,194, filed September 17, 1941, and issued November 12, 1946, as United States Patent No. 2,410,823. Referring more particularly to the drawings, the calculating machine is shown as having an outer casing 21 within which the various instrumentalities of the machine are mounted on skeleton frame members or partition plates 22 disposed between the actuating mechanisms of the several denominational orders and secured together in spaced relationship at suitable points by tie-rods 23. A plurality of columns of digital keys 24, normally held in raised position by means of springs 38, are arranged to extend through a keyboard 25, positioned as part of the upper wall of the casing 21, which keys are adapted for manipulation to determine the digital degree of actuation to be imparted to the different denominational orders of accumulator mechanism. Each column of keys 24 controls the rotation of an accumulator actuating pinion 26 (Fig. 3) journaled upon a transverse shaft 27 that extends across the machine and is supported by the frame members 22. Rotation of each of the actuating pinions 26 is transmitted through an internal ratchet mechanism to a combined lantern wheel and accumulator gear 28 (Fig. 3) which is also journaled on the shaft 27. The gear of each of the lantern wheels 28 meshes with a carrying gear 30 journaled on a shaft 29 (Fig. 3), which is disposed in parallel relationship to the shaft 27. The carrying gears also respectively mesh with intermediate gears 31 journaled on a transverse shaft 32, each of which in turn meshes with a numeral wheel pinion 33 journaled on a transverse shaft 34 and fixed to a numeral wheel 35 (Fig. 3).

Carrying mechanism is provided in each denominational order of the accumulator mechanism for the purpose of imparting a digital unit of actuation thereto each time that a ten's transfer is to take place from the next lower denominational order of the accumulator. This mechanism, as well as that hereinbefore described, is more fully disclosed in United States Letters Patent No. 1,357,747, and No. 1,357,748, issued on November 2, 1920, and includes a carrying-cam member 36 (Fig. 3), which is given a 180° rotation by a suitably carrying motor spring 37 associated with a carrying gear of the next lower denominational order for each ten's transfer that is to be effected. The carrying-cam member 36 acts upon a dolly roll secured to a bell-crank carrying-lever (not shown) to swing the latter in a clockwise direction, viewing Fig. 3. Such swinging of the carrying-lever causes a carrying pawl 41 pivotally mounted on said lever to throw the lantern wheel and accumulator gear 28 a sufficient distance to impart, through the train of gears, a digital unit of actuation to the numeral wheel 35.

The adding is accomplished upon depression of the keys 24 and corresponding actuation of gear sections 42 (Fig. 3) which are in mesh with the pinions 26, a said sector being associated with each denominational section of the accumulator unit in association with its controlling column of keys. The gear sectors and the control and actuating mechanism for them are duplicated for each denominational order of the calculating machine, and a general description of a single set of such mechanism will be sufficient for an understanding of them all, except that they have to be arranged and adapted to cooperate selectively and collectively with the power members.

The gear sectors 42 are mounted upon a shaft 43 which extends through the partition plates 22 of the machine, and are adapted to be moved downwardly (viewing Figs. 2, 3 and 4) on an idle or setting stroke in amount determined by the value of the particular digital key 24 of the associated column depressed, this amount increasing in graduating steps from "1" to "9." The keys 24 in addition act through a power trip mechanism to effect a connection whereby power supplied by an electric motor, indicated generally at 44 (Fig. 3), through a power shaft 45, which is connected to the motor in any suitable manner, is effective to extend a spring 46 associated with the particular order of mechanism with which the key depressed is identified. Release of this spring thereafter accomplishes adding movement in amount determined by the particular digital key of the order depressed. Upon depression of said key, the gear sector 42 is moved through its idle or downward stroke by the power shaft 45 into position to impart proper and accurate digital accumulation to the adding mechanism upon its return movement, which is accomplished by the associated spring 46.

In the calculating machine shown in the drawings, depression of a key 24 causes its stem 47 (Fig. 2) to engage a parallel motion bar 48 which is pivoted at the front at 49 and at the rear at 51 to levers 52 and 53, respectively, which levers are pivoted in turn upon cross shafts or rods 54 and 54' extending through the partition plates 22. A link 55 is pivotally connected at 56 to the lever 52 and at 57 to the lever 53. The bar 48, levers 52 and 53 and the link 55 form part of a parallel motion device, and are constructed and mounted as shown and described in United States Letters Patent No. 2,063,962, earlier mentioned. Further and more particular description of these of these parts is therefore thought to be unnecessary. Each of the gear sectors 42, as stated above, is pivoted upon the cross shaft 43, and through a yielding clutch 63 is articulately connected to a hook 58 by a link 59 (the hook 58 and link 59 being articulately connected to a vertical guide member 60 which in turn is pivotally mounted on a shaft 50). Each gear sector 42 is also articulately connected to a movement controlling bar, generally shown at 61, by a pin 62 securely fixed to an arm 39 of the gear sector 42 (Fig. 3), as will be later described in detail. A spring 64 attached to lever 53 and to a tail piece 65 of a latch member 66 carried by the bar 55 normally contributes toward holding the parallel motion device in elevated position for a purpose which will be presently explained. A dog 67 which is pivoted at 68 on the parallel motion bar 48 is provided with a laterally and downwardly extending lug 69, which is adapted for engagement wtih a lug or shelf 71 on a spring-lifted lever 72 pivotally mounted on the guide member 60 with the hook 58. The operation of the parts is such that upon depression of a key 24, the stem 47 engages and depresses bar 48, imparting motion to the parallel motion device, which carries dog 67 downwardly to depress lever 72. A spring mounted on the pivot between the link 59 and the hook 58 engages the lever 72 and the hook to urge the rear end of the latter downwardly, so that it will normally cause engagement of the hook 58 with a toothed wheel 73 upon depression of lever 72. However, this spring connection between hook 58 and lever 72 will permit movement of the latter by the dog 67 relative to the hook, if the hook is restrained in its normal raised position of Figs. 2 and 4 in a manner to be later described. The toothed wheel 73 is fastened to the power shaft 45, which continually turns in a counter-clockwise direction. The engagement of the hook 58 with the wheel 73 pulls the link 59 toward the rear of the machine, or toward the left, viewing Figs. 2 and 3, which imparts downward motion to gear sector 42, through the yielding clutch 63. Forward motion is thus imparted to the digital control bar 61, until one of several lugs projecting vertically therefrom, as will be hereafter more fully explained, is stopped by the stem 47 of the key 24 depressed.

The rearward motion of hook 58 and link 59, which are articulately connected to each other and to guide arm 60, causes said guide arm to pivot in a counter-clockwise direction about its shaft 50 to extend spring 46, one end of which is connected to the guide arm and the other end to a shaft or rod extending through partition plates 22. The link 59 moves the gear sector 42 downwardly on an idle stroke and into position to impart an adding movement upon release of the hook 58 and contraction of the spring 46. The downward movement of the gear sector 42 is under the control of the digital control bar 61 (Fig. 3), and the gear sector is halted when it has been moved downwardly the proper distance, enabling it upon return to impart the degree of digital advancement to the adding mechanism which corresponds to the particular key depressed. The yielding clutch 63 permits the continuation of the rearward movement of the link 59 after downward movement of the gear sector 42 has been stopped, and until the end of the power stroke and the automatic release of the hook 58. The release of the hook 58 is accomplished automatically in each instance after a set increment of action has been imparted to the link 59, by the teeth of the wheel 73. Upon the return stroke (the operative stroke of the gear sector), the yielding clutch 63 permits relative movement of the parts in reverse direction to the beginning of the adding movement, and thereafter the adding actuation is accomplished.

It is apparent, therefore, that upon depression of a key 24, the digital control bar 61 determines the degree and extent of the downward movement of the gear sector 42, and the bar 48 accomplishes connection of the latter to the power mechanism. Means are provided to prevent return movement of the dog 67 before the hook 58 has opportunity to fully engage the toothed wheel, which means comprise latch member 66 which is pivoted at 74 on link 55. This latch member has an engaging arm 75 which is adapted to engage upon the laterally projecting end 76 of the dog 67 to hold the dog down against return upward movement and the parallel motion device in depressed position. Just prior to the release of the hook 58, a pin 77 in an upwardly extending arm 78 of vertical guide member 60 which, through its connection with hook 58 has been carried rearwardly, engages a finger 79 of latch 66 and frees the dog 67 so that the parallel motion device may return to normal raised position. However, if a digit key is held prolongedly in depressed position thereby preventing the rising of parallel motion bar 48 and dog 67, then means must be provided to assure the continued disengagement of latch 66 and dog 67. Upon the return or forward motion of hook 58, the horizontal shelf 71 of lever 72 engages the lug 69 of dog 67 to rock the dog counter-clockwise to prevent the re-engagement of arm 75 of latch 66 with lug 76 of dog 67 so that upon subsequent release of the digit key all the parts can return to normal position. A bar 81 having rearwardly extended pointed locking lugs or teeth 82, is pivoted upon studs 83 and 83' extending through slots 84 and 84' in bars 48 in each denominational order of the machine, said studs 83 and 83' being secured to bracket levers 52 and 53 respectively. Consequently, upon depression of a key 24, bar 81 is moved rearwardly (to the left viewing Fig. 2), relative to key stems 47. Referring more particularly to Figs. 9 and 10, each key stem is provided adjacent its lower end with an aperture 85 extending therethrough into which the tooth 82 enters in the rearward movement of the bar 81, thus holding the key down until the parallel motion device is released and the parts returned to normal elevated position. It will be understood that, while no two keys 24 of the same column or denominational order may be operated simultaneously, as described in Patent No. 2,043,021 issued June 2, 1936, any key of one order may be operated at the same time as any desired key of any other denominational order or orders.

In the machine in which the present invention is embodied, subtraction is performed in accordance with the method and means fully described in the aforementioned co-pending application, Serial No. 411,194, issued November 12, 1946, as Patent No. 2,410,823. A subtraction control device is provided which comprises a set of keys including "minus" and "equals" control keys 86 and 87, respectively, located to the left of the ordinal series of keys 24.

Referring to Fig. 4, the lower portion of the stem 88 of "minus" key 86 is in engagement with a parallel motion bar 89 which is a modified form of the parallel motion bars 48 earlier described. Depression of the "minus" control key 86 and parallel motion bar 89 causes forward movement (to the right viewing Fig. 4) of a link 255, and allows latch member 266 to engage a dog 267 to hold the parallel motion bar in depressed position. The key 86 is also maintained in depressed position by a tooth 91 formed on a bar 92 which is moved rearwardly upon depression of key 86, allowing tooth 91 to enter an aperture 285 in the key stem 88. Subsequent to depression of the "minus" control key 86, the keys representing the subtrahend are depressed and maintained in such depressed position until the "equals" control key is depressed whereupon the adding actuation which was not immediately responsive to depression of the digit keys is allowed to take place and the keys returned to normal elevated position. The bar 92 also is provided with a vertical projection 93 adapted normally to underlie the stem 88 of the "equals" key 87 to prevent depression of the latter until the "minus" key 86 has been depressed. Upon depression of the "minus" control key 86, its stem 88 engages an upwardly extending arm 94 (Fig. 4) of a lever 95 which is also provided with a downwardly and forwardly extending arm 96 and is pivoted at 97 on a pin fixed to an intermediate plate 22. To the lower end of the lever 95 is pivoted a pawl 98 which is provided with a downwardly extending arm 99, a rearwardly extending horizontal arm 101, and an upwardly extending arm 102. The lower arm 99 is normally positioned above a pin 105 in an arm 106 which is securely fastened to a transverse rock shaft 107. Securely fastened to the shaft 107 are lock arms 108 (Figs. 2 and 3), one for each denominational order of the machine, each of which is provided with a laterally extending lug 109 adapted, upon depression of control key 86 and consequent counter-clockwise rotation of rock shaft 107 through lever 95 and pawl 98, to engage lug 111 of hook members 58.

The parts are maintained in such locking engagement during subsequent depression of ordinal keys representing figures of the subtrahend which, as previously explained, would normally result in a power action through engagement of hook 58 with toothed wheel 73, and until released by depression of the "equals" key 87. Because of such setting of the lock arms 108 into engagement with the lugs 111 of hook members 58 by depression of the "minus" control key 86, subsequently depressed digit keys 24 also are caused to be latched in depressed position by engagement of the teeth 82 in their apertures 85, the associated parallel motion mechanisms being held in lowered position by engagement of dogs 67 by their associated latches 66.

The digital actuation of the adding mechanism is automatically controlled in accordance with the nine's complemental value of the keys depressed in entering a subtrahend in all denominational orders except the units order, in which the ten's complemental value of the key depressed is added. The mechanism controlling the digital actuation of the adding mechanism in each denominational order is indicated generally at 61 (Fig. 6) and comprises a regular stop bar 112 and a complemental stop bar 113, secured together and spaced relative to each other by means of studs 114 (Figs. 5 and 8). The bars 112 and 113 have formed thereon vertically projecting stop lugs 115, the lugs 115 of the stop bar 112 being spaced progressively further back of the key stems from the front to the rear of the machine, and the lugs 115 of stop bar 113 being spaced progressively further back of the key stems from the rear to the front of the machine (as shown in Figs. 3, 5, 6 and 8). The stop lug 115 of the regular stop bar 112 just to the rear of the "1" key is spaced one step back of the "1" key, and the distance from each succeeding stop lug to its associated key stem toward the rear of the machine graduately increases until the rearmost lug is spaced nine steps back of the "9" key. The stop lug of the complemental stop bar 113 just to the rear of the "1" key is spaced eight steps back of the "1" key and the spacing graduately decreases until the lug back of the "8" key is spaced one step therefrom and the last stop lug is just even with the "9" key.

It has been earlier explained that in machines of this type it has been the necessary practice in entering the subtrahend to enter one less in the units order or, in other words, to strike the nine's complement of all orders except the units order, in which the ten's complement was entered to obtain the correct result. The means for controlling the digital actuation of the accumulator mechanism in the units order in accordance with the ten's complement of the key depressed or, if no key has been depressed, to automatically add "10" in such order to bring about the correct result, is accomplished by an arrangement or spacing of the stops on the ten's complemental stop bar 113' of the units order (as shown in Fig. 7), different from that of the nine's complemental stop bar 113 in all other orders. In other words the stops 115 on the ten's complemental stop bar 113' of the movement controlling bar 61 in the units order (Figs. 5 and 7) are spaced progressively one step further back than are the stops 115 on the nine's complemental stop bars 113. The gear sector in the units order therefore is given a relatively greater adding movement by the ten's complemental stop bar 113' than are the gear sectors of all other higher denominational orders under the control of their complemental stop bars 113. The complemental stop bars 113 and 113' are provided at their forward ends with depending arms 116 having a bifurcated portion adapted to embrace the pin 62 located in the upwardly extending arm 39 of the associated gear sector 42 (Fig. 3).

Means are provided, when desiring to enter the complement of the subtrahend during a subtractive operation, for shifting the complemental stop bars 113 and 113' into operative relation with the ordinal series of keys, so that upon depression of a key and subsequent downward movement of the gear sector 42, the complemental value of the key depressed will be added into the accumulator, as distinguished from the actual value of the key depressed when the regular stop bar 112 is in operative relation therewith. The lower portion of stem 88 of the subtraction control "minus" key 86 is provided with an angular surface in engagement with a roll 118 which is rotatably secured to an upright arm 119 (viewing Fig. 3), which in turn is fixedly secured to a longitudinal rock shaft 121 having a bearing in vertical support pieces 117 and 117' which are supported on tie rods 23. Also securely fixed to the rock shaft 121 are upright arms 123 and 124, located at the front and rear of the machine, respectively, (Fig. 3). The upper free portion of the arm 123 is disposed in a small slotted portion 120 of a transverse support bar 125 positioned near the front of the machine (Figs. 3, 5 and 11), which is slidably mounted in the intermediate frame plates 22 and is provided with a plurality of laterally spaced, upstanding pins 126 fixed therein. The pins 126 are adapted to enter the open portion between the stop bars 112 and 113 of the digital control bars 61 to maintain proper alignment thereof with respect to the key stems 47. A similar transverse support bar 127 is mounted at the rear of the machine, and formed thereon is a horizontal arm provided at its forward end with a small slotted portion 120' in which is positioned the upper portion of the upright arm 124. The bar 127 is also provided with pins 126' adapted to be embraced by the open potrion of the digital control bars 61 to maintain proper alignment of the rear ends thereof with respect to the key stems 47. The rock shaft 121 and the support bars 125 and 127 and digital control bars 61 are normally maintained in the position of Fig. 9 under tension of a spring 130 (see Fig. 3) interconnected between the lower end of the arm 123 and a frame plate 22 to retain the regular stop bars 112 in operative relationship with their associated digital key stems.

With such an arrangement, it will be readily perceived that upon depression of the "minus" control key 86, the resulting movement of arm 119 to the right (viewing Fig. 11) will cause the shaft 121 to be rocked counter-clockwise to shift the support bars 125 and 127 to the left (as seen in Figs. 9 and 10) through the medium of upright arms 123 and 124. The digital control support bars 125 and 127, will similarly be shifted to position the stop bars 113 and 113' in operative relationship with the stop portions 19 of the key stems 47. When either of the stop bars 112 or 113 is in operative relation with the stop portion 19 of the ordinal key stem, the other stop bar is completely out of operative relation therewith. A slot 40 is cut in the lower portion of each of the key stems 47 and is adapted to be in alignment with the stop bars 113 and 113' when the stop bars 112 are in effective or operative position relative to the key stems 47, as shown in Fig. 9. When the stop bars 113 and 113' are in effective or operative position relative to the key stems 47, then the stop bars 112 will pass freely by the stop portions 19 at the left of the key stems, as viewed in Fig. 10.

The means for releasing the clutch hooks 58, after the subtrahend has been set up on the keyboard, is under the control of the "equals" key 87, the stem 88 of which is in engagement with a lever 128, see Fig. 4. Depression of key 87 and lever 128 causes clockwise rotation of pawl 98 disengaging its lower arm 99 from pin 105 of the arm 106 and allowing the shaft 107 to be rocked clockwise under the tension of its spring 100, see Fig. 3. The lock arms 108 are thus removed from locking engagement with lugs 111 on hooks 58, thereby allowing those hooks in the denominational orders in which digital keys have been depressed in the previous setting of the subtrahend into the keyboard to drop into engagement with their toothed wheels 73.

As has been mentioned, it is necessary that "9's" be added in all denominational orders other than the units order, in which no digital key has been depressed, and that "10" be added in the units order if no key has been depressed therein, for the purpose already explained. The lever 128 pivoted on a short shaft 131 is provided with an arm 134, the lower bifurcated end 135 of which embraces a pin 136 fixed in the upper end of an arm 137 which is securely fixed to a transverse rock shaft 138. Also securely fixed to the rock shaft 138 are upright arms 139, one for each denominational order, the upper extremities of which are in engageable relationship with pins 141 in links 55 (Fig. 2). Depression of "equals" key 87 through lever 128 and arm 137 causes forward rocking movement of shaft 138 and arms 139, thereby urging links 55 forwardly. The forward movement of the links 55, through the parallel motion device, causes depression of hooks 58 controlled thereby into the paths of their associated toothed wheels. Movement of the parallel motion device not having resulted from depression of a digital key 24 in such order, the bar 61 which controls the digital setting of the sector gear 42 will receive full forward movement, with a consequent maximum downward movement of the gear sector sufficient to add "9" into the accumulator upon the upstroke of the sector under tension of spring 46. When no key has been depressed in the units order, that is, when a zero occurs in the units order of the subtrahend, forward swinging of the arm 139 therein will likewise cause maximum downward movement of the gear sector 42, but the resultant upstroke by the spring 46 will add "10" into the units order of the accumulator.

To automtaically add "9" to the accumulator mechanism of the overflow order to bring to zero position the numeral wheel of that order when a "1" has been carried thereto by the entering of the complemental value of the subtrahend and the subsequent adding of "9's" and carrying of the "1" across the register as just described, a sector 242 is provided, see Fig. 4. The sector 242 is similar to the sectors 42 already described and mounted on the shaft 43, but is directly connected to guide member 260 by link 259, and rearward movement of guide member 260 to move sector 242 downwardly is accomplished through connection with guide member 60 of the next lower denominational order. This connection is effected by depression of "minus" control key 86 and forward movement of link 255 which, through pin 146 fixed in link 255, causes rocking movement of lever 148 and engagement of lock piece 154 with pin 157 fixed in the guide arm 60. The lock piece 154 is mounted on the guide arm 260, and when hook member 58 engages with toothed wheel 73 of the denominational order to the right of the overflow order, resulting either from setting of a digital key 24 therein and/or depression of the "equals" key, the guide member 60 in that order will be pulled rearwardly and, by its connection with guide member 260 of the overflow order, the gear sector 242 of the overflow order will be given a maximum downward movement to add "9" upon its upward movement under the action of spring 246.

As the guide member 260 is moved rearwardly as just described the pin 277 located thereon engages and releases the latch 266 from the dog 267 to allow the parallel motion bar 89 to return to its normal raised position and allowing the key 86 to be raised to its normal elevated position.

Means are provided for preventing the relatching in a depressed position of parallel motion bar 89 and "minus" key 86 if the "equals" key 87 is allowed to rise while the key 86 is still being held depressed by the operator, or if the "equals" key 87 is held down by the operator. To this end, there is provided a forwardly extending arm 159 on latch 266 of the overflow order which is adapted to engage the face of a lip or lug 161 formed at the extremity of a vertical lever 162 (as shown in Fig. 4). The lever 162 is moved slightly clockwise against the tension of its spring 163 by the arm 159 when parallel motion bar 89 is depressed by the "minus" key 86, and link 255, to which the latch 266 is pivoted, is moved forwardly. Subsequent operation of the "equals" control key 87 causes rearward movement of the guide member 260 of the overflow order, as already described, whereupon pin 277 of guide member 260 engages the finger 279 of latch member 266 to swing the latter in a clockwise direction. In such movement of the latch 266, the arm 159 thereof is swung beneath the lip or lug 161 on the lever 162, and the latter is moved rearwardly in a counter-clockwise direction by its spring 163 to maintain the latch 266 in inoperative position. In this position, the downwardly extending arm 275 of the latch 266 is to the rear of projection 276 of dog 267, and the dog cannot be relatched in such position until the parallel motion bar 89 has been allowed to return to its upper or normal position and has again been depressed by the "minus" key 86. Thus the subtractive control devices are compelled to return to normal position after a subtractive operation, and the machine is automatically conditioned for additive operation.

The present invention is more particularly concerned with the provision in such a machine of simplified means for performing division. Heretofore, in machines of the type disclosed, division was performed by a process of repeated addition of the complement of the value of the divisor. For instance, if it were desired that the figure "11,856" be divided by the figure "456," the former was registered in the numeral wheels of the accumulator by depression of the keys bearing those figures, and the finger tips were held in contact with the tops of the digit keys representing the complement of the divisor in the denominational orders immediately above the sight apertures in which the figures "185" appeared (the figure "456" being greater than the figure "118"), the means for locating the complement of the divisor on the keyboard consisting of the inscription on the keys of the nine's complement of the value thereof in small figures (see Fig. 1A), it being necessary to hold the finger tips in contact with the key tops of the digit keys representing the value of the divisor, less one in the lowest significant order of the divisor, on the small complemental figures of the keys. The keys so held, which correspond to the complement of the divisor, were then repeatedly depressed until the numeral wheel in the order next higher than the highest order of the divisor showed a value equal to the number of operations or depressions. If the remainder in the orders into which the complement of the divisor was being entered was greater than the divisor, the repeated depressions were continued until the remainder was less than the divisor, after which the divisor was shifted one order to the right and the process was repeated. By this process the quotient 26 is registered in the numeral wheels of the accumulator with no remainder.

However, where the divisor contained the figure "9" in the units order or in the intermediate order or orders of the divisor between two figures of value, and where the divisor contained a cipher ("0") in an intermediate order or orders between two figures of value, certain rules had to be followed in order to obtain the correct result. For instance, if a "9" occurred as the highest denominational figure of the divisor or as an intermediate figure between two figures of value, it was ignored and no key was depressed in that order in which the "9" appeared. If, however, the "9" occurred as the units figure of the divisor, the same rule as earlier explained was followed and one less, or the small figure "8" was depressed. Also, where a cipher or ciphers occurred as an intermediate figure of the divisor between two figures of value, the small cipher was depressed, but where the cipher or ciphers occurred in orders lower than the lowest significant figure of the divisor they were ignored and no key was depressed in those orders. The above rules formulated to meet certain conditions have been a source of much confusion to the operator and as a result in machines of the type disclosed, the performance of negative calculation, such as subtraction and division, has not been as facile as desired.

In the present invention, however, the operator is completely relieved of the responsibility and mental burden of determining the complement of the divisor and locating it upon the keyboard when performing a division operation. This is accomplished by means of a control key which, as will be more fully explained hereafter, upon depression by the operator, conditions the machine to automatically add to the dividend the nine's complement of any key subsequently depressed in any denominational order higher than the units order, and to automatically add the ten's complement of the key depressed in the units order, and to add the respective complement of zero in all orders to the right of the leftmost or highest order of the divisor where no keys are depressed, except the units order, in which "10" is added if no key is depressed therein. For division operations, the complemental marking of the keys is dispensed with, so there are only the large figures thereon. It will be understood that it is no longer necessary to hold one less than the lowest significant figure of the divisor which has heretofore been necessary in performing division on this type of machine. This is accomplished by automatically adding "9's" in all orders to the right of the lowest significant figure of the divisor except the units order in which "10" is added to cause a carry to take place to add "1" in the denominational order in which the lowest significant digit of the divisor is being depressed.

Further, as will be presently explained, the rules heretofore mentioned in connection with the performance of division when the figure "9" occurred in the units order of intermediate order or orders of the divisor between two figures of value, and where a cipher ("0") occurred in an intermediate order or orders of the divisor, have been completely eliminated. In performing division on the machine of the present invention, where the figure "9" occurs in the divisor, the "9" key is depressed, and where a cipher ("0") occurs, indicating a lack of values, no key is depressed. Division is accomplished, therefore, without the complemental marking of the keys and without the necessity of holding one less in the lowest significant order of the divisor, and without the necessity of reference to or a knowledge of the rules heretofore mentioned in the two preceding paragraphs, all of which have heretofore been a source of much confusion to the operator.

To perform division on the machine in which the present invention is embodied, it is first necessary to enter the dividend into the register wheels of the accumulator by depression of the keys in the usual manner. The present invention is more particularly concerned with the provision of means for facilitating the performance of division by conditioning the machine to automatically control the digital actuation of the actuating mechanism therein in accordance with the complemental value of the keys depressed in entering the divisor. Such means completely eliminate the heretofore dual marking of the keys in accordance with the nine's complemental value thereof, thus relieving the operator of the mental burden connected with determining the complemental value of the divisor. In the exemplary embodiment, after the machine is conditioned for division by depression of a "division" control key, subsequent to the entering of the dividend, the keys representing the figures of the divisor are repeatedly and simultaneously depressed in accordance with the rules heretofore mentioned. However, in accordance with the present invention, it is no longer necessary to hold one figure less than the actual value of the units figure of the divisor which has heretofore been necessary. The addition of the extra "1" in the units order of the divisor as it is depressed in the varying lower denominational orders in performing division is automatically provided for and the keys representing the actual figures of the divisor are simultaneously depressed.

The means for cintrolling the operation of the machine in division consists of a "division" control key 301 which is located to the left of the ordinal series of keys 24 (Fig. 1) below the subtraction control keys 86, 87. The key 301 is provided with stem 88 and spring 38 to normally maintain it in raised position. The stem 88 of the key 301 is provided with an angular lower portion 302 in engagement with a roll 303 which is rotatably secured to an upright arm 119' (viewing Figs. 3, 9 and 10). The arm 119' is rotatably mounted on the rock shaft 121 which, when rocked as earlier described herein, causes the complemental stop bars 113 and 113' to be shifted into operative relationship with the key stems 47 to control the digital actuation of the actuating mechanism in accordance with the complemental value of any key subsequently depressed. Rigidly mounted on the rock shaft 121 is an arm 304, the upper extremity of which is in engagement with a pin 305 fixed in the arm 119'. From said construction it will be readily understood that the rock shaft 121 may be rocked in a counter-clockwise direction. viewing Figs. 9 and 10, to shift the stop bars 113 and 113' to the left when the "minus" control key 86 is depressed, without effecting movement of the arm 119' which is normally maintained in the position of Fig. 9 under tension of a spring 306.

The arm 119' is provided with a lower downwardly extending portion 307 which terminates in a vertical bifurcated end 308 embracing a groove 309 formed in a transverse shaft 311 (Figs. 9 and 10). The shaft 311 is journaled for lateral movement in bearings 312 fixed in the outer frame plates of the machine. and is adapted to be moved to the right against the tension of spring 306 upon depression of the "division" control key 301 which, through medium of arm 304 and pin 305, also rocks the shaft 121 to move the complemental stop bars 113 and 113' into operative relationship with the keys 24.

Mounted on a transordinal shaft 313 which is disposed in parallel relationship with the shaft 311 are actuation levers 314 which are provided between adjacent denominational orders (see Figs. 2, 3, 9, 10 and 12). The levers 314 are provided with vertical arms 315 and 316 which are joined together by a transverse bail portion 317, the arm 316 being slightly offset to the right, viewing Fig. 12, so as to be aligned with the arm 315 of the lever 314 of the next lower denominational order for a purpose to be presently explained. The levers 314 are normally maintained in the lateral position of Figs. 9 and 12 under the tension of spring 306 which as earlier explained, is connected at one end to the arm 119' which is in communication with the laterally movable shaft 311 through the downwardly extending portion 307 and bifurcated end 308.

Clinched to the shaft 311 are shifting arms 322 which are provided with bifurcated rearward portions 323 adapted to embrace the shaft 313. An arm 322 is provided between each two levers 314 and also on the outside to the left and right of the set of levers 314 adjacent the arms 315 and 316 respectively. In the position of Figs. 9 and 12 the upper extremities of the arms 315 and 316 are out of the plan of movement of the pin 141 of the link 55. In such position the levers 314 are prevented from rotative movement on the shaft 313 by means of a pin 318 fixed in the intermediate frame plate 22 which is adapted to enter an aperture 319 in the extremity of a horizontal rearward extension 321 (see Fig. 3) formed on the lower end of the vertical arm 315.

When the shaft 311 is shifted, to the right viewing Figs. 9 and 10, by depression of "division" control key 301, the shifting arms 322 which are clinched to the shaft 311 move with it to cause lateral sliding movement of the levers 314 into the plane of movement of, and engaging relationship with the pins 141 in the links 55. In the position of Fig. 10 it will be noted that the aperture 319 in the horizontal extension 321 on the arm 315 has been freed from engagement with the pin 318 fixed in the intermediate frame plate 22 and the lever 314 is then free for rotational movement on the shaft 313 as will presently be described. In such position it will be noted that the arm 315 is forward of the pin 141 while its associated arm 316 is rearward of the pin 141 of the next lower denominational order, to the left viewing Fig. 10. With such an arrangement it will be readily apparent that the forward action given to a link 55 by depression of a key 24 will cause, through the pin 141 and arm 315, clockwise rotation (viewing Fig. 12) of the lever 314. Through the associated arm 316, forward movement is transmitted to the link 55 of the next lower denominational order which movement imparts motion to the associated parallel motion bar to cause depression of the hook 58 controlled thereby into the path of its associated toothed wheel 73, which results in an adding actuation in that denominational order. Therefore, as each link 55 is given forward movement it transmits this motion through the arms 315 and 316 to the link 55 in the next lower denominational order. Movement of each parallel motion device not having resulted from depression of a digital key 24 in such order, it will be readily apparent that bar 61 which controls the digital setting of the gear sector 42 will receive full forward movement, with a consequent maximum downward movement of the gear sector sufficient to add "9" into the accumulator upon the upstroke of the sector under tension of spring 46. In the units order also, the gear sector 42 will receive maximum downward movement, but the resultant upstroke by the spring 46 will add "10" into the units order of the accumulator. Adding of "10" in the units order causes a carry of the tens to take place in every order in which "9" has been automatically added to the right of the lowest order of the divisor until finally the "1" is carried into the order in which the units figure of the divisor has been added. Thus the depressing of keys corresponding to one less than the actual value of the divisor when the keys are simultaneously depressed in performing division on the instant type of machine has been made unnecessary.

To insure full forward movement of the links 55 despite the cumulatively increasing strain upon the ordinal elements of the series of overlapping actuation levers 314, there is provided in association with each yielding clutch 63 a cam portion 325 (Figs. 2 and 3) formed integrally with the center disk of the yielding clutch 63. As earlier mentioned, the link 59 is articulately connected to the yielding clutch 63 through this center disk. When an ordinal key 24 is depressed the link 55 is moved forwardly as earlier described to permit engagement of the hook 58 with toothed wheel 73 which causes rearward movement of the link 59. As the link 59 is moved rearwardly, the center disk of the yielding clutch 63 to which it is connected is rotated in a clockwise direction, viewing Fig. 2, and the cam portion 325 engages a roll 326 mounted on pivot or stud 56, to which the forward end of link 55 is connected, to positively force forward movement of the link 55 and remove any strain attendant with the function of the overlapping actuation levers 314 as earlier described.

Due to the slightly delayed return of the link 55 because of the engagement of the cam 325 with the roll 326, the return of the key under fast operation is also somewhat slower, so means are provided to prevent re-engagement of latch 66 and dog 67 after disengagement by the pin 77 as earlier described. To this end there are provided latches 327 (Figs. 2, 13 and 14) each having hub portions 328 and being mounted on a transverse shaft 329. Each latch 327 is provided with an upwardly and rearwardly extending portion 331 and terminates in a horizontal arm 332 which is adapted to underlie the pin 77 on the guide arm 60 and be resiliently maintained in engagement therewith by means of a spring 333. As a key 24 is depressed and the link 55 moves forwardly, the latch 66 carried by the link 55 also moves forwardly disposing the finger 79 above the arm 332 of the latch 327. As the clutch hook 58 engages with the toothed wheel 73 and the link 59 and guide arm 60 move rearwardly the pin 77 mounted in the arm 78 engages the finger 79 to release the latch 66 from the dog 67. As the pin 77 moves rearwardly in an arc, the horizontal arm 332 is allowed to rise under tension of spring 333 when the finger 79 is moved rearwardly from engagement with the extremity of the horizontal arm 332. When the guide arm 60 and link 59 move forwardly under the tension of spring 46 after release of the clutch hook from the toothed wheel, the pin 77 is removed from engagement with the finger 79 which is allowed to rotate in a counter-clockwise direction under tension of spring 64 but which contacts the end of the arm 332 and is maintained in released position relative to the dog 67 until the guide arm 60 and the link 59 have reached full forward position. As the guide arm is being rotated clockwise about its pivot 50 under tension of spring 46 the pin 77 strikes the upper surface of the arm 332 and cams it downward out of engagement with the finger 79 and the latch 66 is allowed to be rotated to its normal position of Fig. 2. However, as previously explained, the shelf 71 of lever 72 strikes lug 69 of dog 67 to hold the dog out of engageable relationship with latch 66 after said latch has returned to its normal position so that no re-engagement of the latch and dog is possible if the digit key is prolongedly held in depressed position. Without the latches 327, the latches 66 would re-engage with dogs 67 after every key stroke, to be released only by the forward motion of the lugs 76 to the dogs 67 out of engagement with the arm 75 of the latch 66 when the dogs 67 are swung counter-clockwise by shelves 71 of levers 72, which would make the rising of the keys too slow for fast operation of the machine.

As has been described, upon depression of the keys representing figures of the divisor when performing division, "9's" are automatically added in all denominational orders where no keys are depressed to the right of the left-most order in which a key is depressed. In such automatic actuation of the orders to the right, resistance to forward movement of the link 55 by actuation levers 314 is present in the springs 64 and 334 of the denominational orders to the right of the key operated order and it may be possible that the link 55 may be moved forwardly enough to cause latching engagement between latch 66 and dog 67 but not sufficient to result in engagement between the clutch hook 58 and toothed wheel 73. Means are provided, therefore, for releasing the dog 67 from the latch 66 in any orders in which such a condition exists by operation of the zeroizing crank 335 or depression of a release key 371. Mounted on a stud 336 fixed in the intermediate frame plate 22 toward the rear of the machine is an arm 337, having a pin 338 fixed in the lower portion thereof (Fig. 19). A lever 339 is mounted on the pin 338 and extends forwardly and downwardly terminating in a hook 341 in engagement with a notch 342 (Fig. 19) cut in a transordinal shaft 343. At the right hand side of the machine, viewing Fig. 1, an arm 344 (Fig. 15) is rigidly mounted on the shaft 343 and has pivotally secured to its upper extremity a link 345 which is provided with a slot 346 at its forward end. Disposed within the slot 346 is a stud 347 which is mounted in the intermediate portion of a depending lever 348 (Fig. 15) which is part of the zeroizing mechanism and adapted to be rotated in a counter-clockwise direction about its pivot 349 when the zeroizing crank 335 is pulled forwardly, or to the right viewing Fig. 15. As the zeroizing crank 335 is pulled forwardly the notched shaft 343 is rotated in a clockwise direction against the tension of spring 340 which is connected to the lower extremity of the arm 344, urging the levers 339, the hooks 341 of which are in engagement with notches 342 (Fig. 19), forwardly and downwardly against the tension of springs 351. Mounted in the dog 67 is a pin 352 which is in engagement with the rear edge 353 of a cut out portion 354 of the lever 339. Therefore, when the lever 339 is moved forwardly and downwardly the edge 353, through its engagement with the pin 352, will swing the dog 67 counter-clockwise (Fig. 19) about its pivot 68 causing its release from the latch 66 and return of the parallel motion device to its normal elevated position.

Figure 11:
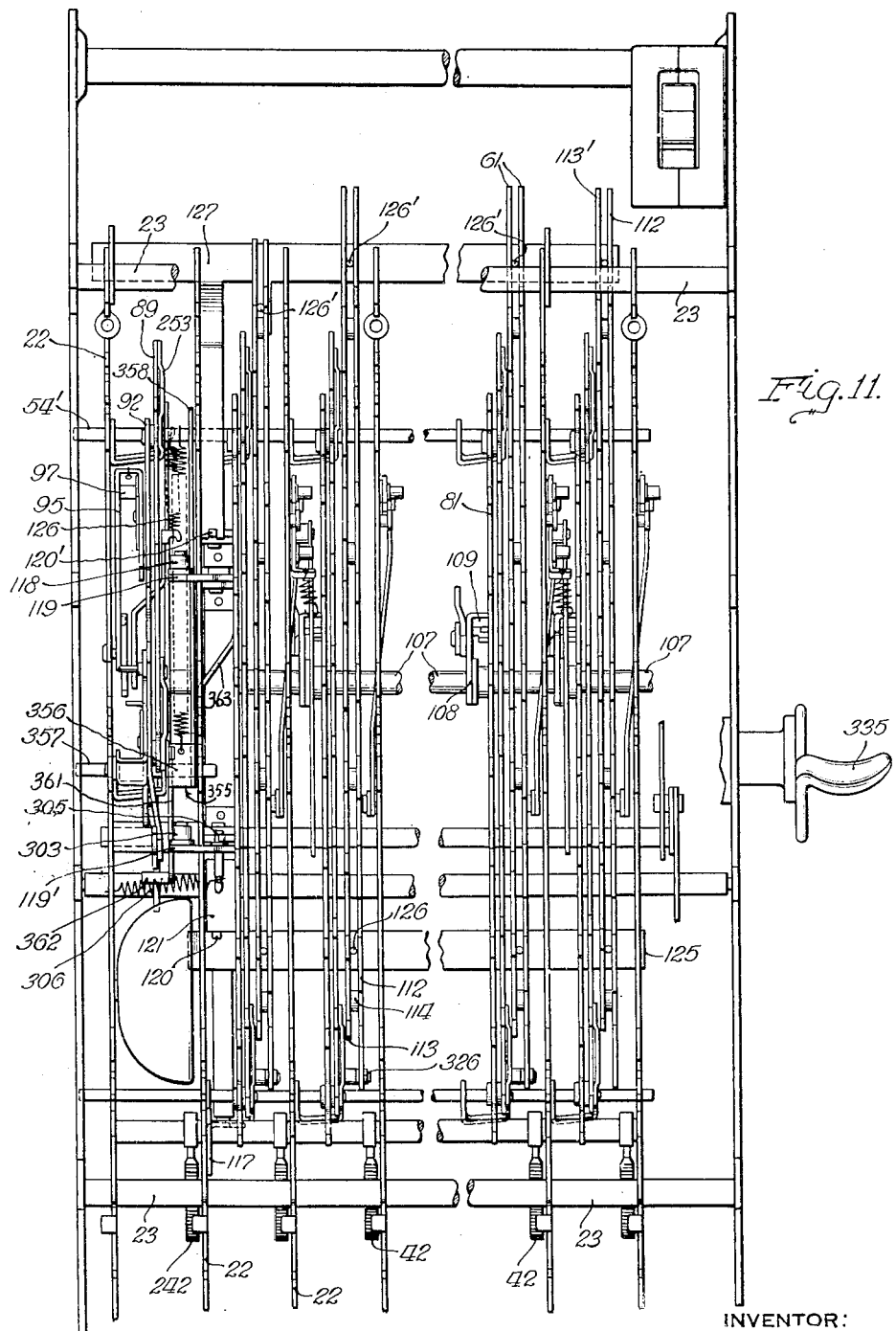
Figure 11 is a top plan view, broken away centrally from front to back, of the calculating machine shown in Fig. 1, showing details of the arrangement of the digital actuation control mechanism and shifting means.

In Fig. 20 is shown a latch releasing lever 355 which is provided in the leftmost or highest denominational order of the machine in order to clear certain parts which obstruct and prevent the use of the key-release mechanism of Fig. 19 in that order. The lever 355 is provided with a hub portion 356 and mounted for slight longitudinal movement in the overflow order on a short shaft 357, see also Figs. 4 and 11, journaled in the intermediate frame plates 22. The lever 355 is provided with a rearwardly extending arm 358 which has an elongated aperture 359 in its rear extremity through which extends the transverse shaft 54'. A forwardly extending arm 361 having a lateral lug 362 at its forward end is also formed on the lever 355. There is also provided a third arm 363 which is offset to extend rearwardly into the denominational order lower than, or to the right of, the overflow order. At its free end the arm 363 is provided with a vertical finger or lug 364 in engagement with the pin 352 in the dog 67. The lateral lug 362 on the arm 361 is in engagement with a vertical lock lever 365, as shown in Figs. 4 and 11, which is mounted on a transverse shaft 366. Intermediate its ends the lock lever 365 is provided with an added portion 367 which extends into a notch 369 in the shaft 341. As the rock shaft 341 is turned by forward movement of the zeroizing crank 335, as described, the vertical lever 365 being in engagement with the notch 369 therein is also rotated against the tension of its spring 368 in a clockwise direction, viewing Fig. 4, about its pivot 366. Such movement of the lever 365 results in forward movement of the lever 355 through engagement of the lug 362 with the lever 365 and, the vertical lug or finger 364 being in engagement with the pin 352 in the dog 67 causes release of the dog from its associated latch 66.

It may be desirable, however, to preserve totals already accumulated in the register wheels 35, in which case operation of the zeroizing crank 335, which causes return of the register wheels to zero, would not be desirable. Therefore, additional means are provided for causing release of the dogs 67 from latches 66 when a condition as previously mentioned exists in the machine. This means, however, has additional functions which will later be described in detail. A release key 371 is located on the right hand side of the machine, viewing Fig. 1, and is provided with a stem 372, Fig. 15, which is in engagement at its lower end with a lateral shelf 373 formed on a lever indicated generally at 374 which is pivotably mounted on a stud 375. The lever 374 also has formed thereon rearward and forward vertical arms 376 and 377, respectively, joined together by horizontal connecting portions 378. A link 379 forms a connection between the forward arm 377 of the lever 374 and the arm 344 which is mounted on the shaft 343. Therefore, depression of release key 371 causes its stem 372 to engage the lateral shelf 373 and rotate the lever 374 about its pivot 375 in a counter-clockwise direction (Fig. 15) against the tension of its spring 381. Such rotation of the lever 374 causes rocking of the shaft 343 through link 379 and arm 344 with a consequent release through mechanism just described of any dogs 67 which have been engaged by latches 66 resulting in the condition earlier described.

In the use of the machine to perform division, the dividend is registered on the numeral wheels 35 by depressing the digital keys 24 bearing the figures of the dividend and located in the denominational orders respectively corresponding to those of the digits in the dividend. The division key 301 is thereafter depressed to its set position wherein it is releasably locked. In moving downwardly, the division key 301 rotates the shaft 121 and thus moves the positive calculation control stop bars 112 out of, and the negative calculation control stop bars 113 into, cooperative relationship with any digital keys 24 which are subsequently depressed. Consequently, the subsequent depression of digital keys will result in the entry of the tens-complement of the value on the keys depressed in the units order and the nines-complement of the value on the keys depressed in each other order.

Beginning with the left-most sight opening 150 (Fig. 1) revealing a digit of the dividend and proceeding to the right, a number of digits of the dividend equal to the number of digits in the divisor are compared in value with the divisor. If, on the one hand, such digits of the dividend, considered as a number, are equal to or greater than the divisor, the finger tips are arranged to contact the digital keys 24 representing the respective digits of the divisor in those left-most denominational orders, unless one or more of the digits in the divisor are ciphers, indicating a lack of values in such denominational order or orders of the divisor. If, on the other hand, such digits of the dividend, considered as a number, are less than the divisor, the finger tips, similarly arranged, are shifted to the right a distance equal to that between adjacent columns of digital keys 24 to contact the digital keys representing the respective digits of the divisor in the denominational orders wherein the second-from-the-left and rightward-succeeding digits of the dividend appear, unless one or more of the digits in the divisor are ciphers. The finger tips are arranged to contact a "9" key in each divisor, and not to contact a digital key in any denominational order corresponding to a digit of zero value of the divisor.

With the finger tips so arranged, the digital keys 24 representing the divisor are repeatedly and simultaneously depressed until the number of depressions equals the changing leftmost figure appearing in the sight openings 150 and thereafter until the digital values, considered as a number, appearing in the sight openings 150 of the denominational orders wherein the digital keys representing the divisor were depressed are less than the divisor. The finger tips identically arranged are then shifted to the right a distance equal to that between adjacent columns of digital keys 24, and the digital keys representing the divisor so displaced to the right are repeatedly and simultaneously depressed until the number of depressions equals the changing figure appearing in the sight opening 150 immediately to the right of the sight opening 150 wherein, during the preceding manipulation of the digital keys 24 representing the division, appeared the changing number, and until the digital values, considered as a number, appearing in the sight openings 150 of the denominational orders wherein the digital keys representing the divisor were depressed during this second manipulation of the digital keys are less than the divisor. The described key manipulation and shifting of the divisor to the right are repeated until the divisor is shifted to the right at least sufficiently to bring its right-most digit into the same order as the right-most sight opening 150 revealing a digit of the original dividend. The answer is then registered and is visible through the sight openings 150.

When the division key 301 is depressed, it not only conditions, as already described, the illustrated machine to add to the respective denominational orders of the dividend the tens complement of any digital key thereafter depressed in the units order and the nines complement of any digital key thereafter depressed in each of any number of other denominational orders of the machine, but it also conditions the machine, when the digital keys representing the divisor extend to the units order, to add the respective complements of zero in each order, except the units order, to the right of the leftmost or highest order of the divisor wherein no digital key is depressed, and to add "10" in the units order if no key is depressed therein; and, when the digital keys representing the divisor are spaced to the left of the units order automatically to add nines (9's) in the respective orders, except the units order, to the right of the lowest significant figure of the divisor; and to add ten (10) in the units order to cause the carrying mechanism to add one (1) in the denominational order in which the digital key representing the lowest significant digit of the divisor is being depressed.

After completion of a problem of division in the above-described manner, operation of the zeroizing crank 335 or the release key 371 will cause release and return of the division key 301 and the parts set thereby to normal position in which the machine is set for additive actuation.

The vertical lock lever 365, see Fig. 4, served to maintain the "division" control key 301 in depressed position during a division operation and until released by the zeroizing crank 335 or release key 371. As the control key 301 is depressed the bottom surface of the stem 88 engages the angular surface of a projection 383 formed at the upper extremity of the lever 365. Continued depression of the key 301 will cause clockwise movement of the lever 365 about its pivot 366 against the tension of its spring 368 until it has been completely depressed when the projection 383 enters the lower aperture 385 in the key 301. Thus the key 301 is locked in a depressed position until released by operation of the zeroizing crank 335 or depression of release key 371 which causes rocking of the shaft 343. The added portion 367 intermediate the ends of the lever 365 being disposed in the notch 369 of the shaft 343 transmits movement of the shaft to the lever 365 to remove projection 382 from the aperture 385 allowing the key 301 to rise to its normal elevated position under tension of spring 39. A cam finger 383 formed on the upper end of the lever 365 engages the stem 88 of the key 301 when the projection 382 is removed from the aperture 385 thereof, and acts to cam the key 301 upwardly if there is any tendency for the key to stick or bind.

Means are also provided for preventing depression of the "division" control key 301 if the machine has been conditioned for subtraction by depression of the "minus" control key 86. This means comprises a vertical lug 386 (see Fig. 4) formed on the forward extremity of the bar 92 which is pivotally mounted on studs 283 and 283' extending through slots 284 and 284' in the parallel motion bar 89. Upon depression of key 86 the bar 92 is moved rearwardly due to its pivotal mounting in the parallel motion device thus disposing the lug 386 beneath the stem 88 of the key 301 and effectively preventing depression of the key until the subtractive operation has been completed and the keys 86 and 87 have returned to normal elevated position allowing the parallel motion bar 89 and the bar 92 to return to their normal position, as illustrated in Fig. 4.

The bar 92 also serves to prevent depression of the "minus" control key 86 when the machine has been conditioned for division by depression of the "division" control key 301. When the division control key 301 is depressed the stem 88 thereof is in the path of the vertical lug 386 of the bar 92 and movement thereof is effectively prevented. Due to the pivotal mounting of the bar 92 on the parallel motion device, the bar 89 with which the key 86 is in engagement is also locked against full movement and the key 86 is thus prevented from being fully depressed.

Provision is made for preventing simultaneous depression of any of the digit control keys 24 and control keys 86 or 301, and to prevent depression of the control keys 86 or 301 subsequent to depression of the digit keys while they remain in a depressed position. Mounted in the right and left hand support plates 20 of the machine is a transverse rectangular rock bar 391 having clinched thereon latch pieces 392, one for each denominational order of keys. Each latch piece 392 is provided with a lower rearwardly extending portion 393 (Figs. 2 and 21) adapted to enter the aperture 85 of the "1" keys for engageable relationship with anchor-shaped latches or locking members 390, the purpose and function of which is fully described in U. S. Letters Patent No. 2,043,021. Briefly, when a key is depressed the adjacent locking members 390 (Fig. 2) are rocked into locking engagement with the adjacent keys through the medium of the aperture 85 in said keys, causing the progressive rocking of all the locking members into locking engagement with the keys, preventing depression of any key until the depressed key has returned to its normal position to release the locking members. At the left hand side of the machine (viewing Fig. 1) there is provided a longitudinal bar or link 394 (Figs. 21 and 23) which is pivotally connected at the front of the machine to an arm 392' provided in the overflow order. The link 394 extends rearwardly and terminates in a depending portion 395 in which is cut a horizontal key-hole slot 396 within which is disposed a pin 397 (Fig. 22) fixed on the left-hand support plate 20 to support the rear end of the link 394. The slot 396 permits longitudinal movement of the link 394 for a purpose to be presently explained. Disposed between the top and intermediate plates of the keyboard unit 25 adjacent and to the rear of the "minus" control key 86 and "division" control key 301 are brackets 399 provided with ears 398 which serve as bearings for pivot studs 401. Mounted for pivotal movement about studs 401 at their upper ends are vertical guide arms 402 and 403 which are connected at their lower extremities by a pin 404 which is disposed in notches 405 cut in the link 394. The vertical guide arms 403 are provided with forward extensions 406 in alignment with and adapted to enter the upper or lower apertures 285, 385 in the keys 86 and 301, respectively, upon forward movement of the link 394 as shown in Fig. 21. Forward movement of the link 394 is accomplished by depression of a digital control key 24 which causes rocking movement of the locking members 390 which in turn is communicated to the latch pieces 392 which are clinched to the rectangular rock bar 391. Rotational movement of the bar 391 in a counter-clockwise direction (viewing Fig. 21) is transmitted through arm 392' to the longitudinal link 394 thus disposing the forward extensions 406 of the guide arms 403 in the lower apertures 285, 385 of the keys 86 and 301 respectively. In this manner, depression of either of the calculation control keys 86 or 301 is effectively prevented while a digital control key 24 is in depressed position. It will be apparent, also, from the foregoing description that simultaneous depression of a calculation control key 86 or 301 and a digital control key 24 is also effectively prevented. However, after depression of either key 86 or key 301, when no digit keys 24 are depressed, any of the digit keys 24 may be depressed, since the extension 406 associated with the depressed control key 86 or 301 then will enter the upper key-stem aperture 285 or 385.

Mounted on the rectangular bar 391 at the right hand side of the machine, viewing Fig. 1, is a depending arm 408 (Figs. 16 and 18). At its lower extremity the arm 408 is provided with an elongated aperture 409 into which extends a pin 411 which is fixed in the upper end of a lever 412. The lever 412 is mounted for rotational movement intermediate its ends upon the transverse shaft 43 and has a pin 414 fixed in its lower extremity in engagement with a hook portion 415 formed on an arm 416. The arm 416 is part of a two-armed pawl 417 mounted for rotational movement on a stud 418 fixed in the lower extremity of a depending arm 421 formed on a bell crank lever 419 which is also rotatably mounted on the transverse shaft 43. Rotational movement of the lever 419 in a counter-clockwise direction is limited by engagement of the arm 421 with a transverse shaft 407.

Mounted in the arm 421 of the bell crank lever 419 is a limit stud 410 which is normally in engagement with the forward edge of the lower portion of the lever 412 and prevents clockwise movement of the bell crank lever 419 relative to the lever 412, or counter-clockwise movement of the lever 412 relative to the bell crank lever 419. The pawl 417 is also provided with a lower arm 422 having a beveled or angular portion 423. Another bell crank lever 424 mounted on the transverse shaft 313 is provided with a forwardly extending arm 426 having a pin 427 mounted in its end which is adapted to engage the angular portion 423 of the arm 422 and rock the pawl 417 in a counter-clockwise direction against the tension of its spring 430 out of engagement with pin 414 in the lower extremity of the lever 412. The bell crank lever 424 is also provided with a vertical arm 428 which is articulately connected to a link 429. The link 429 (Fig. 15) extends rearwardly and is connected to a depending arm 431 formed on a cam lever 432 which is rigidly mounted on the transverse rock shaft 107 on which lock arms 108 are also mounted. The lever 432 has formed on its upper extremity a cam surface 433 in engagement with which is a roll 434 mounted in the lower portion of the vertical arm 376 of the lever 374. As earlier explained, the lever 374 is also provided with a lateral shelf 373 in engagement with the stem 372 of the release key 371.

Also mounted on the shaft 43 adjacent and to the left of lever 412 (viewing Fig. 17) is another bell crank lever 435 provided with arms 436 and 437. The arm 437 is articulately connected to a rearwardly extending link 438 which is connected rearwardly to an upright cam arm 439 fixedly mounted on the transverse rock shaft 138. Pivoted to the forward extremity of the arm 436 is a pawl 441 which is provided with a downwardly extending arm 442, a rearwardly extending arm 443 and an upwardly extending arm 444. The pawl is normally urged in a counter-clockwise direction (viewing Fig. 16) by a spring 445, and such movement is limited by engagement of arm 444 with a pin 446 secured to an intermediate frame plate when in the position of Fig. 16, and by engagement of arm 442 with a pin 447 when the pawl is in the position of Fig. 18. The above mentioned mechanism comprises the means for interlocking the various control means and digit keys to prevent mis-operation of the same while performing the various forms of calculation.

Also, provision has been made for causing release of the digit control keys from depressed position in the event that an error has been made in setting up the subtrahend on the keys after depression of the "minus" key preparatory to a subtractive operation. If an error has been made, however, by inadvertently depressing a key other than one representing a figure of the subtrahend, the release key 371 will cause the release of the depressed digit control keys so that the correct keys may be depressed. Depression of the release key 371 causes its stem 372 to engage the shelf 373 and to rotate the lever 374 in a counter-clockwise direction (Fig. 15) above its pivot stud 375. Rotation of the lever 374 causes the roll 434 fixed in the lower end thereof to contact the cam surface 433 and, through the cam lever 432, to rotate the shaft 107 in a counter-clockwise direction farther than it has been rotated by depression of the "minus" key 86. Such farther rotation of the shaft 107 causes the lugs 109 formed on the lock arms 108 to ride farther down the face of the lugs 111 and thus force elevation of the hooks 58 from positions in proximity to the toothed wheels 73. Simultaneously through mechanism earlier described, the shaft 343 is rotated in a clockwise direction to cause release of the dogs 67 from the latches 66 in each order in which a key has been depressed thereby allowing the keys 24 to rise to their normal elevated position. As earlier described, after depression of the "minus" control key 86 any digital control keys subsequently depressed will be maintained in a depressed position due to engagement of the latches 66 with the dogs 67 and due to engagement of the lock arms 108 with the lugs 111 of the clutch hooks 58 which prevent engagement of the clutch hooks 58 with the toothed wheels 73 so that the latches 66 are not disengaged from the dogs 67 by the pins 77 thereby to maintain the parallel motion bar 48 and associated parts in depressed position. Depression of the "minus" control key 86 causes, as earlier described, counter-clockwise rotation of the shaft 107 to cause the lock arms 108 to engage the lugs 111 of the clutch hooks 58. Rotary movement of the shaft 107 is transmitted to the bell crank lever 424 by means of the link 429 through the cam lever 432 and the depending arm 431, sufficient to cause disengagement of the pawl arm 417 from the pin 414 fixed in the lower end of the lever 412.

Depression of the release key 371 (see Fig. 15), and the consequent counter-clockwise movement of the cam lever 432 also causes forward movement of the link 429 through its connection with the depending arm 431. The forward extremity of the link 429 being connected with the arm 428 of bell-crank lever 424, the lever is rotated in a clockwise direction and through its arm 426 and pin 427 mounted in the extremity thereof causes no further rotation of two-armed pawl 417 which was previously rocked upon depression of "minus" key 86 as explained. Depression of the release key also causes clockwise movement of the shaft 343 through lever 374 and link 379 which is connected to arm 344 mounted on the shaft 343 as earlier described. Such movement of the shaft 343 causes forward movement of the link 345 (see also Figs. 16 and 18), the cam surface 413 of which contacts the roll 420 fixed in the end of the arm 425 and rocks the bell-crank lever 419 in a counter-clockwise direction. The pawl 417 having been disengaged from pin 414 in the lever 412, rocking of the bell-crank lever 419 will not effect movement of the lever 412 or the rock bar 391. Since some digit keys are in depressed position during this operation the latches 390 act to prevent the clockwise rocking of bar 391, so that if the release key 371 or zeorizing crank 335 were operated there would immediately be a binding action between cam edge 413 of link 345 and the roll 420, were it not for the fact that the pawl arm 416 is disengaged from pin 414 thereby permitting the counter-clockwise rocking of bell-crank 419 independently of the lever 412, arm 408 and rockbar 391.

Similar functioning of the above described mechanism is caused by forward movement of the zeroizing crank 335. As shown in Fig. 15, a link 448 is articulately connected at its rearward end to an inner segment 449 which is fixedly mounted on the same shaft as the zeroizing crank 335 and rotatable with it. At its forward end, the link 448 is connected to the stud 347 in the depending lever 348. Therefore, when the zeroizing lever is pulled forwardly, to the right viewing Fig. 15, the depending lever 348 is rotated about its pivot in a counter-clockwise direction. Such movement of the lever 348 in turn causes forward movement of the link 345 and consequent rocking of the shaft 343, to which the rear end of the link 345 is connected, to cause release of dogs 67 from latches 66 as described. Forward movement of the zeroizing crank also causes, through arm 344 and link 379, counter-clockwise movement of the lever 374, thus, through the roll 434, rocking the cam lever 432 and shaft 107 in a counter-clockwise direction. Such movement of the shaft 107 causes, as has already been described, the lock arms 108 to bear against the lugs 111 and elevate the clutch hooks 58 to their normal position. Rocking of the cam lever 432 also results in further clockwise rotation of the bell-crank lever 424 through the medium of depending arm 431 and link 429 but does not cause further movement of the pawl 417 away from the pin 414 in the lower end of the lever 412 than has previously resulted from the depression of the "minus" key 86, as has been explained. Also, if the key 86 had not been previously depressed, the rocking of the cam lever 432, whether due to the depression of the release key 371 or the operation of the zeroizing crank 335, does not cause the release of the pawl 417 from the pin 414. When the bell crank 419 is rocked due to cam edge 413 of link 345 acting on roll 420, the pivot stud 418 on which the pawl 417 is supported moves forwardly (or to right in Figs. 16 and 18) thereby removing arm 422 of the pawl 417 from proximity with pin 427. Release of the pawl 417 from the pin 414 has occurred prior to counter-clockwise rotation of the bell crank lever 419 about its pivot shaft 43 when the cam surface 413 of link 345 contacted the roll 420 supported on the arm 425 of the lever 419. Thus, and as previously explained, the connection between the bell crank lever 419 and lever 412 has been broken enabling the operation of release key 371 or zeroizing crank 335 when digit keys are in depressed position and when the "minus" key 86 is in depressed position. In this manner, the machine is reconditioned by the release key 371 or zeroizing crank 335 for depression of the keys representing the correct figures of the subtrahend, in readiness for depression of the "equals" control key 87 to complete the subtractive operation.

Depression of the "equals" control key 87 causes, as earlier described, operation of the actuating mechanism in all denominational orders of the machine by clockwise rotation of the actuation shaft 138 which carries vertical arms 139 to urge forwardly the links 55 which control engagement of the clutch hooks 58 with toothed wheels 73. As the shaft 138 is rotated clockwise the arm 439 mounted thereon (see Figs. 16 and 18) is rotated to dispose its upper edge 440 immediately below and in engagement with the roll 420 in the arm 425 of the bell crank lever 419. In such position, that is, when the "equals" control key 87 is depressed and operation of the actuating mechanism is taking place, the arm 439 effectively prevents operation of the release key 371 or zeorizing crank 325 by reason of the roll 420 being positively maintained in the path of movement of link 345. Conversely, when the release key 371 is being depressed or zeroizing crank 335 is being operated, the "equals" control key 87 is prevented from being depressed. Operation of the release key or zeroizing crank results in forward movement of the link 345 and its cam edge 413 causes counter-clockwise movement of the bell-crank lever 419 which disposes the roll 420 in the path of movement of the arm 439. Thus, as the shaft 138 cannot be rotated the "equals" control key 87 cannot be depressed.

Rotational movement of the arm 439 also causes clockwise rotation of the bell crank lever 435 through the link 438 which is articulately connected to the arm 437 thereof. Such movement of the bell crank lever 435 moves its arm 436 downwardly and forwardly allowing the pawl 441 to rotate in a counter-clockwise direction under the tension of its spring 445 until the pawl arm 442 strikes the stop pin 447 fixed in the arm 436, as shown in Fig. 18. As the control key 87 reaches the bottom of its stroke the shaft 107 (see Figs. 4 and 15) is allowed to rotate in a clockwise direction to its normal inoperative position. Such rotative movement causes the link 429 to be moved rearwardly, thus rotating the bell crank lever 424 in a counter-clockwise direction to remove the pin 427 in the arm 426 from engagement with the arm 422 of the pawl 417 allowing the pawl to be rotated under the tension of its spring 430 when the pin 414 in lever 412 is moved into engageable relationship with the hook portion 415 of the arm 416, as will be presently explained.

As the "equals" control key 87 is released to be returned to its normal elevated position the shaft 138, Fig. 4, is rocked in a counter-clockwise direction under tension of spring 140 removing the arms 139, Fig. 2, from engagement with the pins 141 in links 55 allowing the return of the parallel motion bars 48 and associated parts to permit the digital control keys 24 to return to their normal elevated position. The rocking of the shaft 138 also effects, through arm 439 and link 438, counter-clockwise rotation of the bell crank lever 435 causing the free end of the pawl arm 443 to contact the pin 451 and rotate the lever 412 counter-clockwise about its pivot shaft 43 until at the limit of rotational movement of the bell-crank lever the pawl arm 444 strikes the pin 446 fixed to the intermediate frame plate, rocking the pawl 441 in a clockwise direction out of engagement with the pin 451. Such counter-clockwise movement of the lever 412 is transmitted to the rock bar 391 through arm 408. It is here pointed out that the arm 443 of the pawl 441 in the position of Fig. 18 is not in contact with the pin 451 of the lever 412. Therefore, when the "equals" control key 87 is being released and the shaft 138 is turning in a counter-clockwise direction during the release of the digit keys 24, as explained, the shaft 138 is perfectly free to rotate until the point of the arm 443 of the pawl 441 contacts the pin 451. The distance between the point of the arm 443 and the pin 451 is made sufficiently great to allow the shaft 138 to rotate a distance such that when the pin 141 on the link 55 is releasing the parallel motion device, the fingers 82 of the bar 81 (Fig. 2) leave the slots 85 (Figs. 9 and 10) in the key stems 47 of the digit keys 24, whereupon the key springs 38 will elevate the digit keys to normal position. This releasing of the digit keys is timed to occur before the arm 443 of the pawl 441 strikes the pin 451, and thereafter the pin 451 and the lever 412 are free to be moved since the latch pieces 392 can now rock the anchor shaped latches 390. The rocking of the bar 391 causes rearward movement of the longitudinal link 394 to remove the latches 406 from the upper aperture 285 in the "minus" control key stem 83 and from the lower aperture 385 in the stem 88 of the "division" control key 301. Simultaneously, the bar 92 is moved forwardly, since the stem 88 of "equals" key 87 rises from the path of lug 93, Fig. 4, and the lower aperture 285 in the stem 88 of the control key 86 is freed from the tooth 91 allowing the key 86 to rise. As the "equals" control key 87 was being depressed the bell crank lever 419 was moved to the position of Fig. 18 by the cam edge 440 of the cam arm 439 acting on the roller 420. Simultaneously, in the manner previously explained, the lever 128 (Fig. 4) rocked the pawl 98 to disengage its arm 99 from the pin 105 of the arm 106 to permit the shaft 107 to be rotated clockwise by its spring 100 (Fig. 3). The arm 431 of the cam lever 432 (Fig. 15) moves the link 429 rearwardly thereby turning the bell crank lever 424 counter-clockwise to move the pin 427 out of engagement with the end of tthe arm 422 of the pawl 417 to permit the spring 430 (Fig. 18) to turn the pawl clockwise about its pivot stud 418 so that the hook portion 415 of the pawl arm 416 re-engages with the pin 414 on the lower end of the lever 412. Upon release of the "equals" control key 87, the cam arm 439 rotates counter-clockwise with the shaft 138, as explained, so that the cam edge 440 moves rearwardly from under the roller 420 before the end of the pawl arm 443 contacts the pin 451. Thereafter the lever 412 is rotated counter-clockwise and its lower arm acting upon the pin 410 turns the bell crank lever 419 counter-clockwise to cause the roller 420 to swing downwardly while the cam edge 440 is still moving rearwardly and so avoids obstructing the motion of the roller 420. The machine is thus automatically reconditioned for additive actuation when the subtractive calculation has been completed.

As earlier described, the digital control keys 24 are locked against simultaneous depression with the "division" control key 301 until the control key 301 has been fully depressed, in which position it is maintained until released by the release key 371 or zeroizing crank 335.

The "division" control key 301, as earlier described, is maintained in a depressed position by means of the projection 382 formed on the upper extremity of the lever 365 entering the lower aperture 385 in the stem 88 of the key 301, where it is maintained under tension of spring 368. Rocking of the shaft 343 by operation of the release key 371 or zeroizing crank 335 causes the lever 365 to release the key 301 as earlier explained. Operation of the release key 371 or zeroizing crank 335 is also utilized to remove the latch 406 (Fig. 21) from the upper aperture 385 in the "division" key 301 so that it will offer no resistance to the rising of the key 301. Depression of the release key 371 or forward movement of the zeroizing crank 335 results in forward movement, to the right viewing Figs. 16 and 18, of the link 345. The cam surface 413 in engagement with the roll 420 in the arm 425 of the bell crank lever 419 causes the bell crank lever to be rotated about its pivot shaft 43 in a counterclockwise direction. The shaft 107 not having been previously rocked, the arm 426 and pin 427 in the bell crank lever 424 are in the approximate position of Fig. 15 and the arm 416 of the pawl 417 is not disengaged from the pin 414 in the lower end of the lever 412 before rotation of the bell crank lever 419 occurs as just described. At the start of the operation of the release key 371 or the zeroizing crank 335 the shaft 107 begins to rotate counter-clockwise and to move the pin 427 downwardly toward the beveled edge 423 of the arm 422 of the pawl 417, as previously explained. Simultaneously, in the manner just described, the levers 412 and 419 and the pawl 417 begin to turn counter-clockwise about the shaft 43, thereby removing the beveled edge 423 from the path of the downward movement of the pin 427 so that during this operation the pin 427 does not cause disengagement of the pawl 417 from the pin 414. Therefore, rotational movement of the bell-crank lever 419 is communicated to the lever 412 which, through the arm 408, transmits the movement to the transverse rock bar 391, which is rocked in a clockwise direction. Such movement of the bar 391 causes rearward movement of the longitudinal link 394 and the removal of the latches 406 from the lower and upper apertures 385 and 285 of the control keys 301 and 86, respectively.

Except when the machine has been conditioned for subtraction, depression of the release key 371 or operation of the zeroizing crank 335 effects rocking of the bell crank lever 419 in a counterclockwise direction when the cam edge 413 of the link 345 strikes the roll 420 mounted in the arm 425 of the bell-crank lever 419. This rocking movement of the lever 419 is communicated to the lever 412 through the medium of the pawl 417, the arm 416 of which is in engagement with the pin 414 in the lower extremity of the lever 412. When the bell-crank lever 419 is rocked, the pawl 417 is moved to the right (viewing Fig. 16) and the tail portion 422 thereof is removed from the path of movement of the pin 427 when the bell-crank lever 424 is also rocked in a clockwise direction by depression of the release key 371 or operation of the zeroizing crank 335. Except when the machine is conditioned for subtraction, therefore, the pawl 417 is not disengaged from the lever 412 and operation of the release key 371 or operation of the zeroizing crank 335 will effect clockwise rocking movement of the rectangular bar 391. Such movement of the bar 391 causes rearward movement of the link 394 and removal of latches 406 from the apertures 285 and 385 of the calculation control keys 86 and 301, respectively.

It is thought that the invention and its attendant advantages will be understood from the foregoing description, and it will be apparent that various changes may be made in the form, construction and arrangement of the parts without departing from the spirit and scope of the invention or sacrificing all of its material advantages, the form hereinbefore described and illustrated in the drawings being merely a preferred embodiment thereof.

I claim:

1. In a calculating machine, a plurality of ordinal columns of digit keys, a primary calculation control key, a secondary calculation control key, means to prevent the depression of said secondary calculation control key unless said primary calculation control key is in depressed position, interlocking means operable by said digit keys to prevent simultaneous operation of said primary calculation control key and any of said digit keys, means operable by depression of said primary calculation control key to latch the same in depressed position, and relief means formed in said primary calculation control key for cooperation with said interlocking means to permit the subsequent operation of said digit keys after said primary calculation control key is in depressed position.

2. In a calculating machine, a plurality of ordinal columns of digit keys, a primary calculation control key, a secondary calculation control key, means to prevent the depression of said secondary calculation control key unless said primary calculation control key is in depressed position, interlocking means operable by said digit keys to prevent depression of said primary calculation control key when said digit keys are in other than normal non-depressed position, means operable by depression of said primary calculation control key to latch the same in depressed position, and relief means formed in said primary calculation control key to permit the subsequent depression of said digit keys after said primary calculation control key is in depressed position.

3. In a calculating machine a plurality of ordinal columns of digit keys, a primary calculation control key, a secondary calculation control key, a tertiary calculation control key, interlocking means to prevent the depression of said secondary calculation control key unless said primary calculation control key is in depressed position, a second interlocking means to prevent the simultaneous operation of said primary and tertiary control keys, a third interlocking means operable by said digit keys to prevent depression of either said primary or tertiary calculation control keys when said digit keys are in any position other than normal non-depressed position, means to latch said primary calculation control key in depressed position, and means to latch said tertiary calculation control key in depressed position, said primary and tertiary control keys being formed with relief means cooperating with said third interlocking means to permit the subsequent depression of said digit keys while either said primary or said tertiary calculation control key is in depressed position.

4. In a calculating machine, a plurality of ordinal columns of digit keys, a primary calculation control key, a secondary calculation control key, means to prevent the depression of said secondary calculation control key unless said primary calculation control key is in depressed position, interlocking means to prevent simultaneous operation of said primary calculation control key and any of said digit keys, means to latch said primary calculation control key in depressed position, means to permit the subsequent operation of said digit keys while said primary calculation control key is in depressed position, means settable by said primary calculation control key to cause the latching of subsequently depressed said digit keys in depressed position, an auxiliary control means to release said digit keys from depressed position without disabling said settable means, means operable by said secondary calculation control key to disable said settable means, and means operable by said secondary calculation control key to release said primary calculation control key from latched depressed position.

5. In a calculating machine, a plurality of ordinal columns of digit keys, a primary calculation control key, a secondary calculation control key, means to prevent the depression of said secondary calculation control key unless said primary calculation control key is in depressed position, interlocking means to permit depression of said primary calculation control key only when said digit keys are in normal non-depressed position, means to latch said primary calculation control key in depressed position, said primary calculation control key having means cooperating with said interlocking means to permit the subsequent depression of said digit keys while said primary calculation control key is in depressed position, means settable by said primary calculation control key to cause the latching of subsequently depressed said digit keys in depressed position, a plurality of auxiliary control members manually operable to release said digit keys from depressed position without disabling said settable means, means operable by said secondary calculation control key to disable said settable means, and means operable by said secondary calculation control key to release said primary calculation control key from latched depressed position.

6. In a calculating machine, a plurality of ordinal columns of digit keys, a primary calculation control key, a secondary calculation control key, a tertiary calculation control key, interlocking means to prevent the depression of said secondary calculation control key unless said primary calculation control key is in depressed position, a second interlocking means to prevent the simultaneous operation of said primary and tertiary calculation control keys, a third interlocking means operable by said digit keys to prevent depression of either said primary or tertiary calculation control keys when said digit keys are in any position other than normal non-depressed position, means to latch said tertiary calculation control key in depressed position, said tertiary control key being formed with relief means cooperating with said third interlocking means to permit the subsequent operation of said digit keys while said tertiary calculation control key is in depressed position, and a plurality of auxiliary control members to release said tertiary calculation control key from latched depressed position.

7. In a calculating machine, a plurality of ordinal columns of digit keys, a primary calculation control key, a secondary calculation control key, a tertiary calculation control key, interlocking means to prevent the depression of said secondary calculation control key unless said primary calculation control key is in depressed position, a second interlocking means to prevent the simultaneous operation of said primary and tertiary calculation control keys, a third interlocking means to permit depression of either said primary or tertiary calculating control key only when said digit keys are in normal non-depressed position, means to latch said tertiary calculation control key in depressed position, means to permit the subsequent operation of said digit keys while said tertiary calculation control key is in depressed position, and a plurality of auxiliary control members to release said tertiary calculation control key from latched depressed position only when said digit keys are in normal non-depressed position.

8. In a calculating machine, a plurality of ordinal columns of digit keys, a primary calculation control key, a secondary calculation control key, a tertiary calculation control key, a plurality of auxiliary control members, interlocking means to prevent the depression of said secondary calculation control key unless said primary calculation control key is in depressed position, a second interlocking means to prevent the simultaneous operation of said primary and tertiary calculation control keys, a third interlocking means to prevent the operation of said digit keys simultaneously with the operation of said primary or tertiary calculation control key or said auxiliary control members, and means operable upon depression of said primary calculation control key to disable part of said third interlocking means to permit operation of said auxiliary control members subsequent to the operation of said digit keys.

9. In a calculating machine, a plurality of ordinal columns of digit keys; a first calculation control key; a second calculation control key; a third calculation control key; a first interlocking means to prevent the depression of said second calculation control key unless said first calculation control key is in depressed position, a second interlocking means to prevent the simultaneous depression of said first and third calculation control keys; a third interlocking means to prevent the depression of said digit keys simultaneously with the depression of said first or third calculation control keys; means to latch said first calculation control key in depressed position; means to disable said third interlocking means upon depression of said first calculation control key whereby to permit the subsequent depression of said digit keys; means settable by said first calculation control key to cause the latching of subsequently depressed said digit keys in depressed position; a plurality of auxiliary control members to release said digit keys from depressed position, if some of them have been inadvertently depressed, without disabling said settable means; a fourth interlocking means to normally prevent the operation of said auxiliary control members when said digit keys are in depressed position; means operable upon depression of said first calculation control key to disable said fourth interlocking means; a fifth interlocking means operable upon depression of said second calculation control key to prevent operation of said auxiliary control members; means operable upon depression of said second calculation control key to disable said settable means; means operable upon depression of said second calculation control key to unlatch said first calculation control key, said first interlocking means serving to delay the release of the first calculation control key until said second calculation control key is released and allowed to return to normal non-depressed position; means operable upon the rising of the second calculation control key to render said fifth interlocking means inoperative and to return said fourth interlocking means to operative condition; and the subsequent release of the first calculation control key by the first interlocking means serving to return the third interlocking means to operative condition.

10. In a calculating machine, a plurality of digit keys, an auxiliary control member, interlocking means operatively associated with said digit keys and said auxiliary control member so as to be blocked against movement in response to depression of any of said digit keys to normally prevent the operation of said auxiliary control member when any of said digit keys are in depressed position, a calculation control key, and means operable upon depression of said calculation control key to disable said interlocking means to permit the operation of said auxiliary control member when any of said digit keys are in depressed position.

11. In a calculating machine, a plurality of digit keys, an auxiliary control member, interlocking means operatively associated with said digit keys and said auxiliary control member so as to be blocked against movement in response to depression of any of said digit keys to normally prevent the operation of said auxiliary control member when any of said digit keys are in depressed position, a first calculation control key, means operable upon operation of said first calculation control key to disable said interlocking means to permit the operation of said auxiliary control member when any of said digit keys are in depressed position, a second calculation control key, and means operable upon operation of said second calculation control key to reset said interlocking means to normal operative condition.

JALMER M. LAIHO.

REFERENCES CITED

The following references are of record in the file of this patent:

UNITED STATES PATENTS

| Number | Name | Date |
|---|---|---|
| 1,914,401 | Butler | June 20, 1933 |
| 1,926,826 | Turck | Sept. 12, 1933 |
| 2,315,464 | Turck | Mar. 30, 1943 |
| 2,410,823 | Laiho | Nov. 12, 1946 |